United States Patent [19]
Zaccarin et al.

[11] Patent Number: 5,210,605
[45] Date of Patent: May 11, 1993

[54] METHOD AND APPARATUS FOR DETERMINING MOTION VECTORS FOR IMAGE SEQUENCES

[75] Inventors: André Zaccarin, Quebec City, Canada; Bede Liu, Princeton, N.J.

[73] Assignee: Trustees of Princeton University, Princeton, N.J.

[21] Appl. No.: 714,010

[22] Filed: Jun. 11, 1991

[51] Int. Cl.$^5$ ............................................. H04N 7/18
[52] U.S. Cl. ...................................... 358/105; 358/136
[58] Field of Search ............... 358/105, 133, 135, 136, 358/140, 141, 22

[56] References Cited

U.S. PATENT DOCUMENTS

| | | | |
|---|---|---|---|
| 4,217,609 | 8/1980 | Hatori et al. | 358/136 |
| 4,278,996 | 7/1981 | Netravali et al. | 358/136 |
| 4,371,895 | 2/1983 | Koga | 358/136 |
| 4,460,923 | 7/1984 | Hirano et al. | 358/136 |
| 4,562,468 | 12/1985 | Koga | 358/133 |
| 4,675,733 | 6/1987 | Tanimoto | 356/138 |
| 4,776,029 | 10/1988 | Shimura | 382/56 |
| 4,827,340 | 5/1989 | Pirsch | 358/136 |
| 4,924,306 | 5/1990 | Van der Meer et al. | 358/105 |
| 4,947,249 | 8/1990 | Kondo | 358/135 |
| 4,958,226 | 9/1990 | Haskell et al. | 358/136 |
| 5,008,748 | 4/1991 | Carr et al. | 358/136 |
| 5,012,336 | 4/1991 | Gillard | 358/140 |
| 5,083,202 | 1/1992 | Parke | 358/105 |
| 5,099,323 | 3/1992 | Morimura et al. | 358/105 |
| 5,099,325 | 3/1992 | Artieri et al. | 358/105 |

OTHER PUBLICATIONS

T. Koga et al., "Motion Compensated Interframe Coding For Video Conferencing", in Proc. Nat. Telecommun. Conf., pp. G5.3.1-5.3.5, New Orleans, LA, Nov. 29-Dec. 3, '81.

J. F. Jain & A. K. Jain, "Displacement Measurement & Its Application In Interframe Image Coding", IEEE Trans. Comm., vol. COM-29, No. 12, pp. 1799-1808, Dec. 1981.

R. Srinivasan & K. R. Rao, "Predictive Coding Based On Efficient Motion Estimation", IEEE Trans. Comm., vol. COM-33, No. 8, pp. 888-896, Aug. 1985.

S. Kappagantula & K. R. Rao, "Motion Predictive Interframe Coding", IEEE Trans. Comm., vol. COM-33, No. 9, pp. 1011-1015, Sep. 1985.

A. Puri, H. —M. Hang & D. L. Schilling, "An Efficient Block-Matching Algorithm For Motion-Compensated Coding", in International Conference On Acoustics, Speech, and Signal Processing, pp. 25.4.1-25.4.4, 1987.

M. Ghanbari, "The Cross-Search Algorithm For Motion Estimation", IEEE Trans. Comm., vol. COM-38, No. 7, pp. 950-953, Jul. 1990.

*Primary Examiner*—Victor R. Kostak
*Assistant Examiner*—Michael H. Lee
*Attorney, Agent, or Firm*—Watov & Kipnes

[57] ABSTRACT

In an imaging system, block based motion estimation is used to determine motion vectors for blocks of pixels in a current frame or field. Only a portion of blocks from a predetermined pattern of blocks in a current frame or field are searched for a match with a block of pixels in a previous frame or field over a designated search area. Motion vectors for the blocks of the current frame or field not selected for searching are obtained by interpolation from motion vectors obtained for associated searched neighboring blocks, respectively.

25 Claims, 23 Drawing Sheets

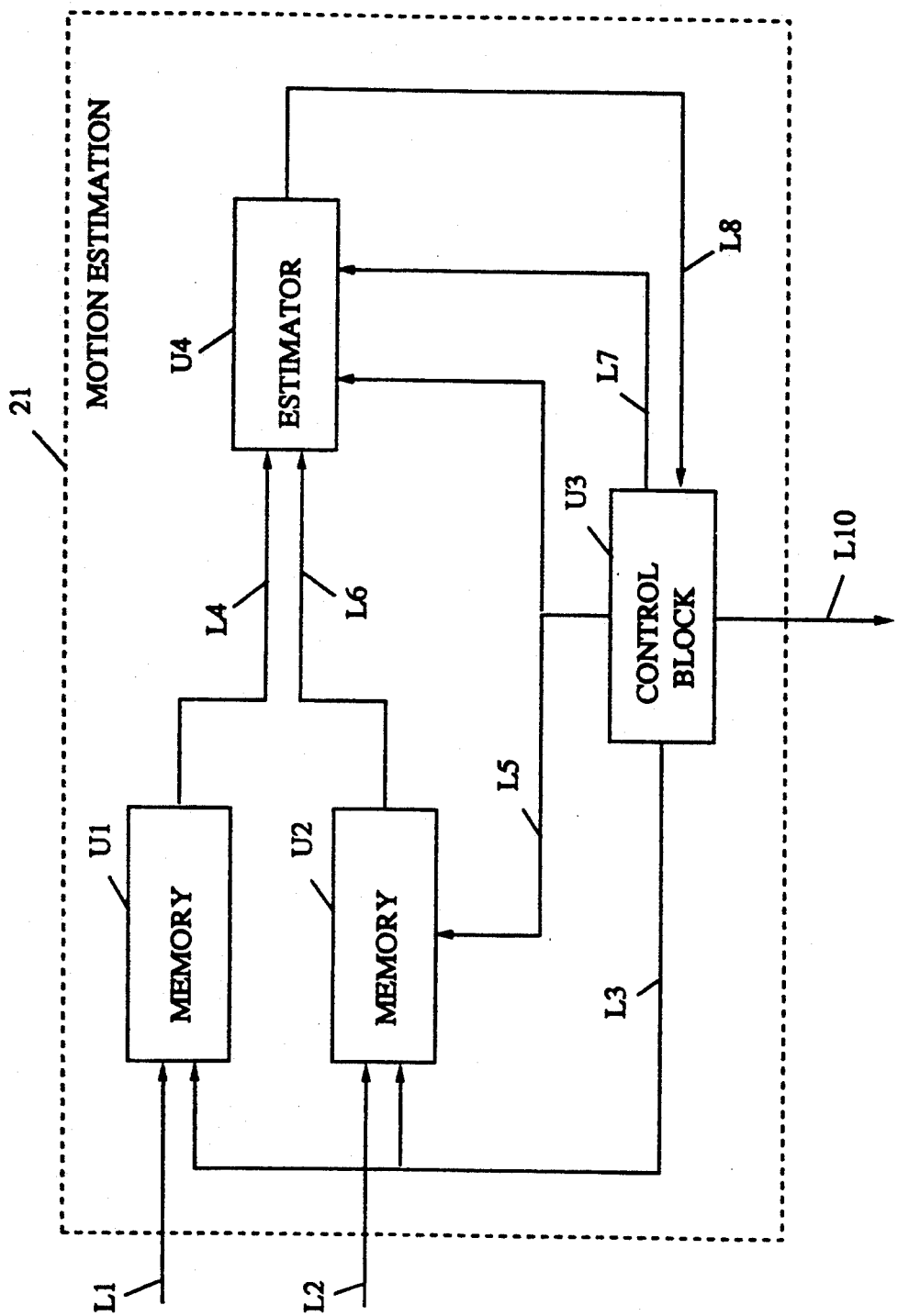

METHOD AND APPARATUS FOR DETERMINING MOTION VECTORS FOR IMAGE SEQUENCES

FIELD OF THE INVENTION

The field of the present invention relates generally to systems for transmitting and storing image sequences, and more particularly to methods and apparatus for reducing the computational complexity in determining motion vectors for block based motion estimation.

BACKGROUND OF THE INVENTION

An image sequence, such as video, consists of frames of images. The coding of video sequences has been the focus of a great deal of research in recent years. High Definition Television (HDTV), video conferencing and CD-ROM archival are some of the possible applications. In the coding of such sequences, information on motion of objects in the scene from one frame to the next plays an important role. Because of the high redundancy that exists between the consecutive frames of a video sequence, high compression ratios can be obtained. For example if there is no moving object, a frame would be identical to the previous frame. The receiver can simply repeat the previous frame, and there is no need to send the current frame. The natural way to exploit the redundancy between consecutive frames consists in predicting a frame using a prior frame.

Ideally, a current frame can be reconstructed from the immediately previous frame and the difference between the current and previous frames, i.e. by using the motion information. In applications such as video conferencing, video telephone, and digital television, motion is the key to data compression. The extraction of motion information is computationally intensive and puts a burden on the hardware designed to perform such a task. In HDTV, for example, the use of four high speed processors operating in parallel was proposed recently.

In video sequences using interlaced scan, each frame is composed of two fields: one containing only the even scan lines, and one containing only the odd scan lines. It is well known that in such interlaced sequences, motion can be estimated by dividing the pixels in each field into blocks and estimating the motion of the blocks from a full or limited search in a prior field or fields.

The majority of systems determine the motion information using a block based approach. In this approach, as shown in FIG. 1 hereof, the present frame 1 is divided into blocks of pixels 3. For each block of pixels, a search is made in the previous frame 7 for the block of pixels that is the closest to it. The location of that closest block relative to the present block then defines a motion vector. To determine the closest matching block in the previous frame, a search area 13 is selected. The block 5 selected of the present frame 1 is placed on the previous frame 7 at one position 9. The pixels of the two blocks are compared. The present block is then moved to a different position 11 and another comparison is made. This process is continued until all positions in the search area 13 have been searched. The position that yields the best match is taken as the position of the current block 5 in the previous frame 7, and thus defines a motion vector. Such an approach is called the full search or the exhaustive search approach. The determination of motion vectors by the full search approach is computationally intensive.

Various approaches have been suggested to reduce the search, but the performance of these reduced search approaches are inferior to that of the full search. A number of known prior systems are discussed below.

In Hatori et al. U.S. Pat. No. 4,217,609, a television signal coding system is discussed which chooses both intra-field differences or encoding between picture elements, and inter-field difference quantizing between picture elements in one frame and an immediately successive frame. The restored values of the picture elements obtained from the intra-field predictive coding and the inter-field predictive coding are compared to a true picture element value for selecting the coding then providing the smallest error. Inter-field coding is selected when successive frames are indicative of a stationary picture, whereas intra-field coding is selected between successive frames in which the picture is moving.

Netravali et al. U.S. Pat. No. 4,278,996 teaches a "pel recursive" method and system for encoding pictorial information. The intensity value of the picture elements in a successive frame are first predicted relative to the intensity of the corresponding picture elements in the immediately prior frame adjusted by a predetermined gain factor. If an error is detected that exceeds a predetermined value, this is indicative of the pixels having moved or changed position, whereby the intensity value for the picture element at the given location is then recorded. Otherwise, it is assumed that the picture element remains unchanged between one frame and an immediately successive frame. In another embodiment of the invention, a dual prediction mode is incorporated for detecting changes in intensity beyond a predicted intensity between successive frames, and changes in displacement relative to predicted changes in displacement. Prediction errors are transmitted or encoded only if the error exceeds a predetermined level.

Tanimoto U.S. Pat. No. 4,675,733 refers to a bandwidth compression system. In FIG. 3A thereof, a subsampling technique is shown which is used for reducing the number of pixels sampled in a high definition television signal by one-half, for reducing the sampling frequency from 64.8 MHz to 32.4 MHz. A bandwidth compression system is then utilized to further reduce the number of pixels by a factor of one-half, and to reduce the frequency bandwidth required to 8.1 MHz. In FIG. 3B thereof, a subsampling pattern is shown for selecting predetermined ones of the pixels in the pattern for transmission. The number of basic pixels transmitted is equivalent to about one quarter of the original number of pixels of the associated frame. The basic pixels are processed through an interpolation circuit 20 (see FIG. 2A), for synthesizing the deleted pixels through an interpolation scheme based upon the weighted average values of neighboring basic pixels. The basic and synthesized pixels are transmitted to a receiver, for reconstructing the image. If the receiver detects an excessive error between the basic pixels and the synthesized pixels, only the basic pixels are used for reconstructing the image.

Shimura U.S. Pat. No. 4,776,029 teaches a method for compressing image signals. As shown in FIG. 2 thereof, and as described in column 4, lines 1 through 28, a Mask is formed for providing a moving average filter, whereby at any given time the average value of the pixels in the Mask frame (in this example a 3×3 picture element size or nine pixels are included within the Mask area) is calculated for providing an average image signal representative of the Mask. After the smoothing process, a sampling pattern is predetermined as shown in the example of FIG. 3 thereof, for sampling selected ones of main signals as shown.

Pirsch U.S. Pat. No. 4,827,340 refers to a video-signal-coding system that includes predictor circuitry for switching between two-dimensional intraframe predictors and pure interframe predictors. The decision as to which of the predictor networks or circuits are chosen is dependent upon a determination of where the least error in coding can be obtained.

Van der Meer et al. U.S. Pat. No. 4,924,306 shows a method and apparatus for providing motion estimation for pixels of a video picture. The comparisons are made relative to threshold values, which if exceeding are indicative of motion. The extent of motion of a given pixel is determined by comparing that pixel with a group of pixels from a subsequent or prior frame.

Kondo U.S. Pat. No. 4,947,249 teaches a system for coding digital video data. The pixels of each frame are encoded using a subsampling in one embodiment as shown in FIG. 4 thereof (see column 4, lines 42 through 68, and column 5, lines 1 through 19). As described a "thinning-out" process is used for eliminating a number of picture elements from being transmitted, but always within a sampling block such as shown in FIG. 4 at least one picture element is transmitted without modification. The other picture elements are compared with an average value of two other picture elements, and if the comparison results in an error below a predetermined threshold, then the pixel or picture element being examined is eliminated. Contrariwise, if the detected error is greater than the given threshold, the picture element is transmitted.

Haskell et al. U.S. Pat. No. 4,958,226 teaches the encoding of and decoding of motion in digital video in a system employing motion compensated interpolation. Two out of every three frames is interpolated for providing information coding in replacement of actual frame coding information for obtaining a reduction in the corresponding number of bytes that must be transmitted.

Carr et al. U.S. Pat. No. 5,008,748 teaches a system for coding video signals. Only picture elements of a frame which have changed relative to a previous frame are transmitted. A frame is broken down into a plurality of blocks, and picture elements of a selected block are compared with those of a corresponding block of a previous coded image to produce a matrix of values indicative of any change in value between the blocks for identifying regions of each block that have changed, whereby these changed regions are coded for transmission. Also, for each block or image area that is compared, that one of a plurality of possible sequences of picture elements within the area is selected which has the highest correlation between successive elements in the sequence.

Gillard U.S. Pat. No. 5,012,336 refers to a method and apparatus for converting a video signal conforming with a first video standard to a video signal conforming to a second video standard. Gillard teaches the "comparison of a plurality of blocks in respective first and second intervals of a video signal with a plurality of blocks in respective intervals of the video signal adjacent thereto for deriving a corresponding plurality of motion vectors for each of the plurality of blocks representing motion of the image portion represented by each of the plurality of blocks." Each interval of the video signal is equivalent to each frame of video for the corresponding picture. "The content of a search block in one field or frame is compared with the respective contents of a plurality of search blocks comprised in a search area in the following field or frame, to determine the minimum difference between the contents so compared, and hence the direction and distance of motion (if any) of the content of the original search block."

Koga U.S. Pat. No. 4,371,895, teaches a system for transmitting and receiving coded video information. In this system a frame of video is formed into a plurality of blocks of picture elements. The blocks of picture elements are processed for generating prediction errors indicative of the difference in value between the picture elements of a given block and the predicted values of such elements. The detected errors are utilized for optimizing the prediction signals. The optimized prediction error signals are coded and compressed for a transmission to a receiver, which decodes the information for reassembling the associated frame of video information.

Hirano et al. U.S. Pat. No. 4,460,923 discloses another predictive coding system for video signals. The system disclosed is similar to that of the immediately above-described Koga U.S. Pat. No. 4,371,895.

Koga, U.S. Pat. No. 4,562,468 discloses another adaptive predictive coding apparatus for coding video signals.

In T. Koga, et al., "MOTION-COMPENSATED INTERFRAME CODING FOR VIDEO CONFERENCING", Proc. Nat. Telecommun. Conf., pp. G5.3.1–5.3.5, New Orleans, La., Nov. 29-Dec. 3, 1981, the use of an algorithm for providing block-by-block motion compensated video data is taught. Motion vectors relative to video information on a frame-by-frame basis are determined by a trial and error iterative process. Comparisons are made between frames through use of blocks of picture elements. This paper is related to the above Koga U.S. Pat. No. 4,371,895, and teaches a limited search technique.

The present inventors recognize that there is a need in the art to reduce the complexity of methods and apparatus for estimating motion vectors in imaging systems.

SUMMARY OF THE INVENTION

An object of the invention is to provide a method for reducing the complexity for motion estimation in imaging systems.

Another object of the invention is to provide an improved method and apparatus for estimating motion vectors between successive but not necessarily consecutive frames of an imaging system.

With these and other objects in mind, and in consideration of the need in the prior art, in various embodiments of the invention, a predetermined block pattern is utilized for each successive frame of pixels, and given blocks are selected from the pattern of one frame for comparison with given blocks of pixels in a prior frame in a predesignated search area. The block of the prior frame search area most closely matching the block of the present frame chosen for matching is positionally compared for defining a motion vector indicative of movement of the present block relative to its position in the prior frame. The motion vectors for predetermined selected blocks from a given pattern of blocks are then used for estimating the motion vectors of adjacent or neighboring blocks. The motion vectors indicative of the movement of a given block of pixels are transmitted for permitting a present frame to be constructed from a prior frame of pixels. The process is continued in an repetitive manner for successive frames.

The particular block pattern utilized typically is chosen from a tradeoff between desired performance and desired reduction in computational complexity. In another embodiment of the invention, at a first level of computation the frame of pixels is divided up into a predetermined block pattern, and at a more extended or lower level of computational reduction each block of pixels of a pattern is itself divided into a predetermined pattern of pixels, whereby only a fraction or given ones of the pattern of pixels within the block are used for comparison with similarly patterned blocks of pixels within a search area of a prior frame for determining the motion vector. In this manner, even greater reduction in the computational complexity is attained. Alternatively, in yet another embodiment, the frame of pixels is divided into blocks but not of any pattern, with each block of pixels being divided into a pattern as indicated above.

BRIEF DESCRIPTION OF THE DRAWINGS

Various embodiments of the present invention are illustrated below with reference to the drawings in which like items may be identified by the same reference designation, wherein:

FIGS. 4, 5A, 5B, 6, and 7 are block diagrams showing details of one of the submodules of FIG. 3 of various embodiments of the invention, respectively.

DETAILED DESCRIPTION OF THE INVENTION

Figure 1:
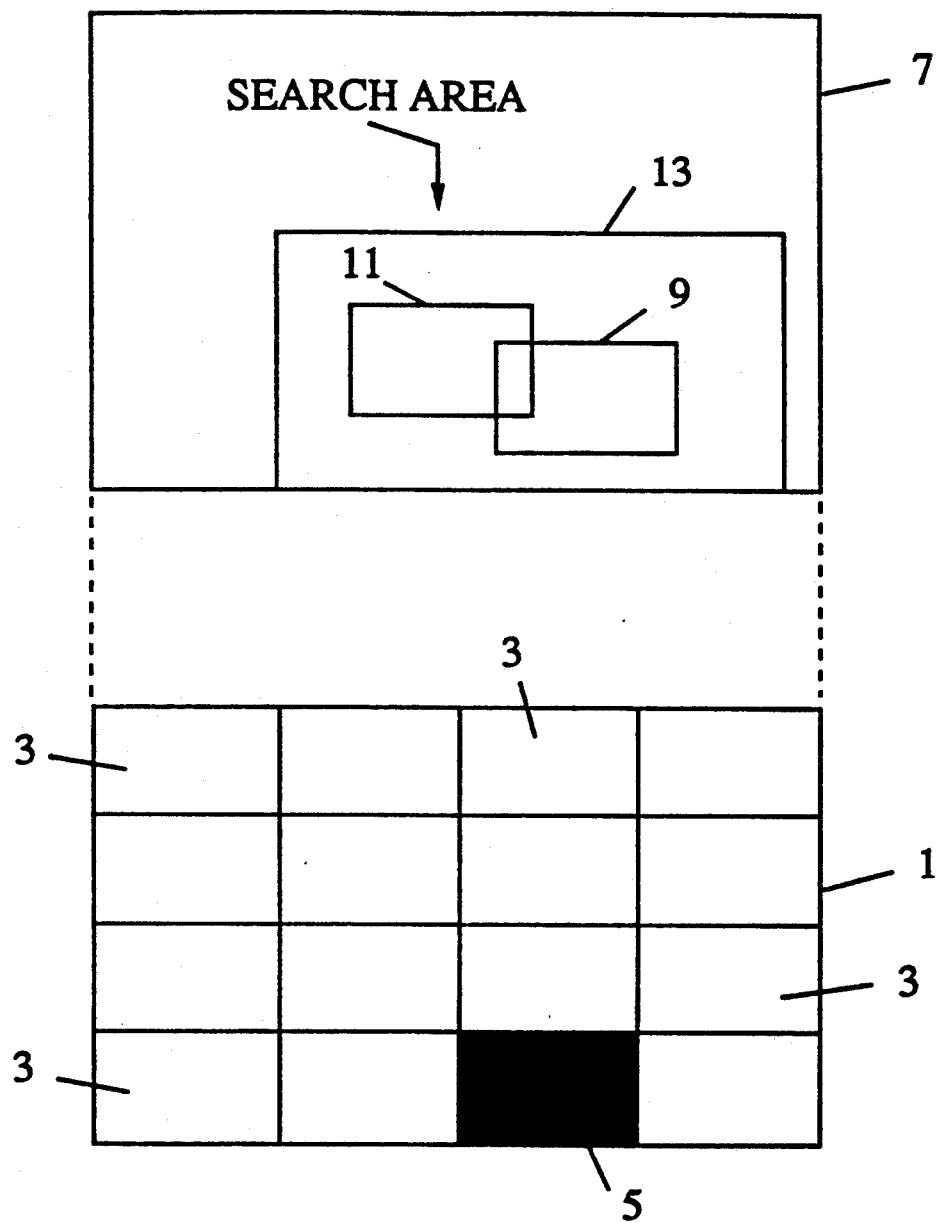
FIG. 1 shows a known block estimation technique for determining motion vectors.
Figure 2:
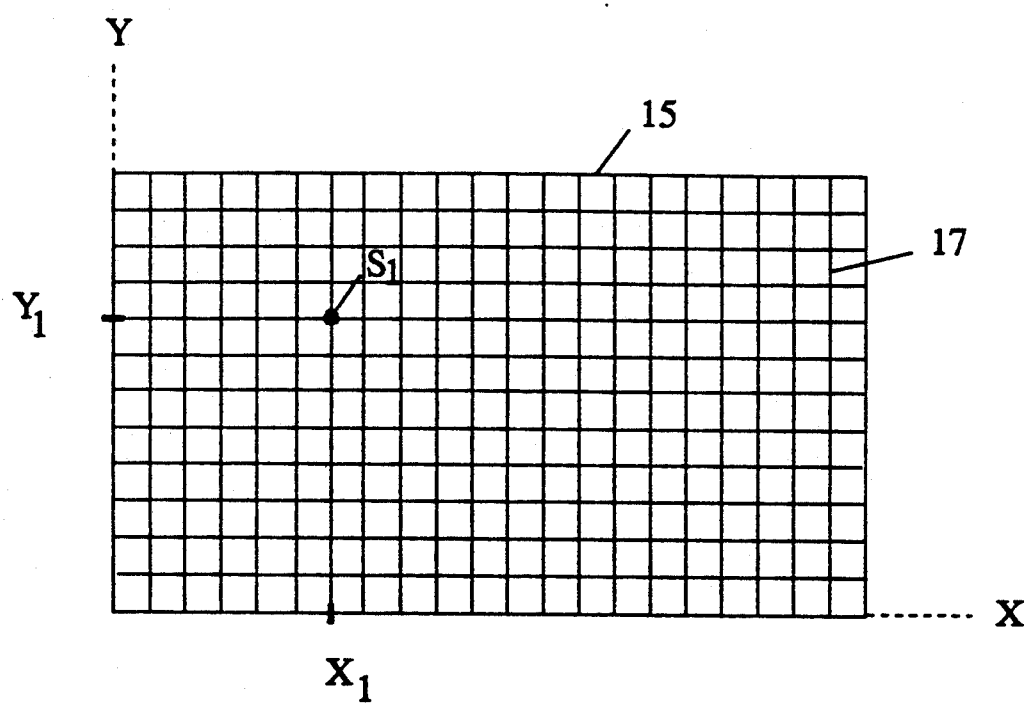
FIG. 2 is a pictorial diagram showing a rectangular lattice of pixels in a typical image frame.

As shown in FIG. 2, each frame 15 of the image sequence consists of pixels on a rectangular lattice 17. Although this illustration is based upon pixels arranged in a rectangular lattice, the present embodiments of the invention are applicable to non-rectangular lattices such as quincunx or offset lattices. A point s in lattice 17 is specified by (x,y) where x and y denote the row and column indices, respectively. In this example $S_1$ is at ($x_1$, $Y_1$). $I^n(s)$ denotes the intensity at pixel s of frame n (n=1,2,3, . . .) to be coded and $\tilde{I}^n(s)$ denotes the pixel intensity of the corresponding decoded frame. In color images, $I^n(s)$ and $\tilde{I}^n(s)$ may refer to the intensities of the red, green, or blue components, or they may refer to the luminance, or one of the chrominance components. The pixel argument s is omitted when referring to an entire frame, e.q. $I^n$. A motion vector v is a two dimensional vector relating two pixels $s_1$ and $s_2$ on the lattice S; viz $v = s_1 - s_2$. The motion vector $v_a^n$ represents the object motion from frame $n-1$ to n. The subscript "a" denotes either a pixel, or a group of pixels to which the motion vector is assigned; it is omitted when its meaning is understood from the text. The set of motion vectors for all pixels is called a motion field. Note that the example discussed above defines motion vectors in terms of successive frames n and n−1 (n=2,3,4 . . .). However, in general, motion vectors can be defined in terms of frames that are not necessarily immediate successors. For example, the motion vectors can be defined from frames n and n−2, or frames n and n−5.

The displacement frame difference $DFD^n(s,v)$ produced by a motion vector v at pixel s of frame n is shown in equation (1) below:

$$(1) \quad DFD^n(s,v) = I^n(s) - \hat{I}^{n-1}(s-v).$$

The $DFD^n(s,v)$ represents the error produced by predicting $I^n(s)$ with a pixel from the previously decoded frame. The argument (s,v) is omitted when its meaning is understood from the text.

Figure 3:
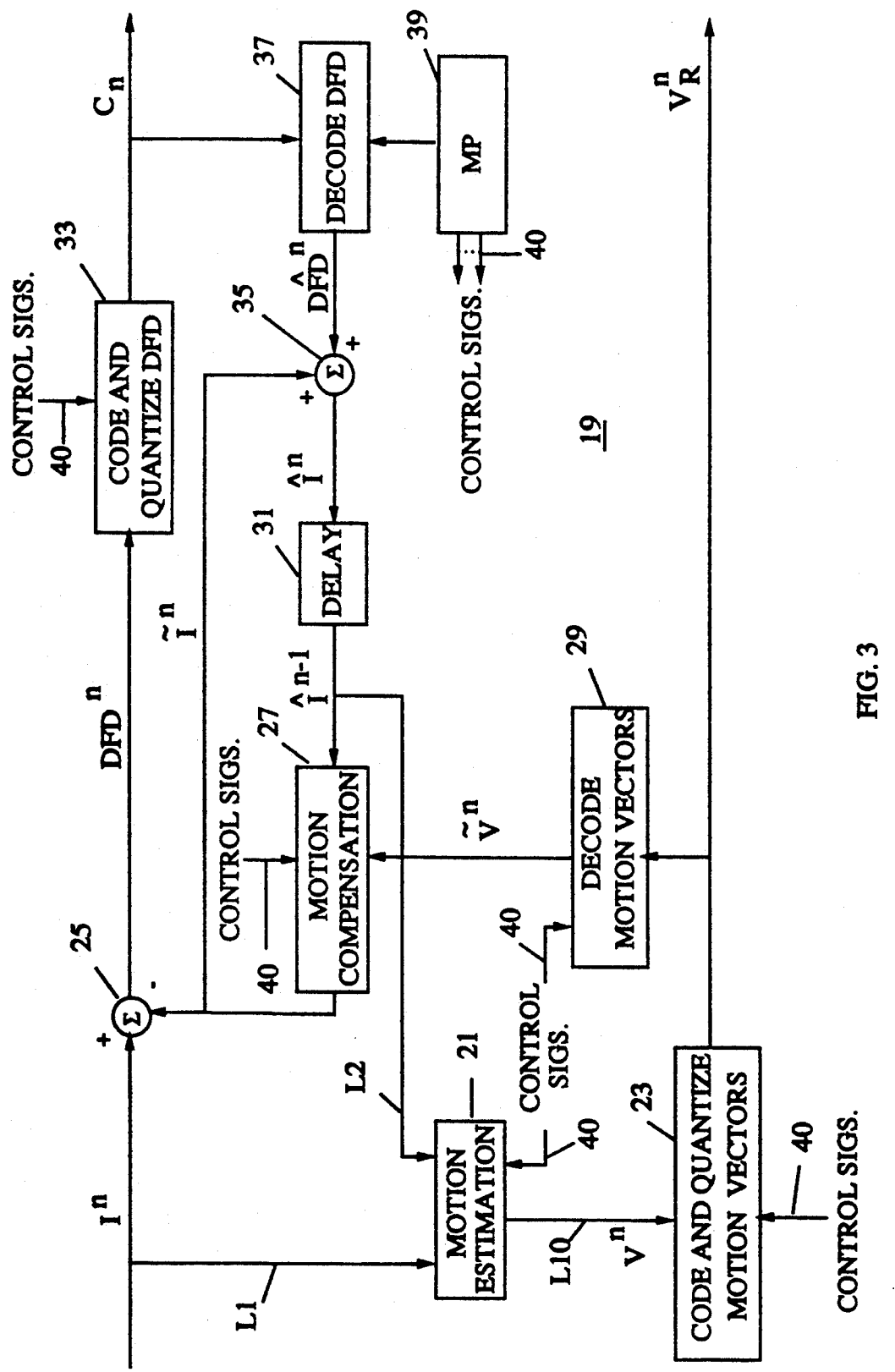
FIG. 3 is a simplified block diagram of submodules required for carrying out various embodiments of the invention.

FIG. 3 illustrates an encoder 19 for a typical block based motion compensation coding system. As shown the encoding subsystem 19 includes a motion estimation module 21, a module 23 for the coding and quantizing of motion vectors, a subtractor 25, a motion compensation module 27, a module 29 for decoding motion vectors, a delay module 31, a code and quantizing DFD module 33, a summer 35, a decode DFD module 37, and a microprocessor 39, for example.

Within encoder 19, a decoder is included for providing access to decoded frames. The decoding is a two-step process for reconstructing each frame: the first being motion compensated prediction (MCP)27, and the second being displaced frame difference decoding (DFDD)37. MCP 27 uses the previously decoded frame $\tilde{I}^{n-1}$ and a motion field $\tilde{v}^n$ to construct an estimate of the current frame as shown in equation (2).

$$(2) \quad \tilde{I}^n(s) = \hat{I}^{n-1}(s - \tilde{v}^n).$$

The motion field $\tilde{v}^n$ is decoded from a set of block motion vectors which are determined at the encoder, coded and transmitted over the channel. Thus $\tilde{v}_R^n$ is an encoding of the motion field $v^n$ which is originally computed at the encoder.

At the code and quantize DFD module 33, $I^n - \tilde{I}^n$ is coded to obtain a set of coefficients $c^n$, which are transmitted over the channel. The decoded displaced frame difference, denoted by $\hat{DFD}^n$, is decoded from the coefficients $c^n$. Thus, $\hat{DFD}^n$ differs from $DFD^n$ by the quantization noise associated with generating and decoding $c^n$.

At the summer 35, the estimate of the current frame $\tilde{I}^n$ is improved by adding the decoded DFD:

$$(3) \quad \hat{I}^n(s) = \tilde{I}^n(s) + \hat{DFD}^n(s, \tilde{v}^n).$$

The motion estimation module 21 is involved with various embodiments of the invention. Details are illustrated in FIG. 4, and discussed below. Also, a microprocessor 39 is shown in this example, for providing primary control signals via appropriate programming. The microprocessor 39 can also be replaced by hardwired logic if desired.

The function of the motion estimation block 21 of FIG. 3 is described with reference to FIG. 4. The pixels of the present frame, fed from line L1, are stored in memory unit U1. The pixels of either an immediately preceding frame, or of some other previous frame, fed from line L2, are stored in memory unit U2. The pixels of the frame are processed by blocks in this example. Parallel processing can be used, i.e. a number of blocks of pixels can be processed simultaneously. The function of the motion estimation block 21 is described below for the case where the processing is done sequentially. It is possible to modify the illustrated embodiments for processing several blocks in parallel.

The motion estimation procedure is controlled by the control block U3. The control block U3 outputs on line L3 the address of the block of pixels to be processed, designated herein as the present block. The control block U3 also outputs on line L5 a shift vector obtained from the motion estimation procedure. The memory unit U1 receives from line L3 the address of the present block of pixels, and outputs the pixels of that present block of pixels on line L4. The memory unit U2 receives from line L3 the address of the present block of pixels and the shift vector from line L5. It then sends on line L6 the pixels of the block whose address is equal to the address of the present block shifted by the values of the shift vector. In some motion estimation procedures of this invention, blocks of pixels are separated in categories. According to which category a block belongs and the shift vector, the processing to be performed on the blocks varies. The control block U3 sends on line L7 a signal indicating the type of processing to be performed.

The estimator U4 receives from line L4 the pixels of the present block, from line L6, the pixels of the block from the preceding frame, and from line L5, the shift vector used to determine the block from the preceding frame. The estimator U4 then determines the sum of absolute difference (SAD) according to the signal received on line L7. Other criteria such as the MSE can also be used. The estimator U4 also determines the shift vector minimizing the SAD, and outputs the minimizing shift vector on line L8. When the motion estimation of the present block is terminated, the control block U3 receives from line L8 the minimizing shift vector, and outputs the minimizing shift vector on line L10.

The function of the estimator U4 in FIG. 4 is described with reference to FIG. 5A. The pixels of the present block are fed by line L4 and the pixels of the block from the preceding frame are fed by line L6 to the arithmetic unit U6. The SAD is computed in the arithmetic unit U6 according to the signal fed from line L7. The result of the calculation is sent on line L11. Register U9 contains the shift vector that minimizes the SAD in the previous steps of the motion estimation process. Register U8 contains that minimum value of the SAD. The shift vector stored in register U9 is sent on line L15. The minimum value of the SAD stored in register U8 is sent on line L13. The comparator unit U7 receives on lines L5 and L15 the shift vectors whose SAD values are also fed to the comparator unit U7 via lines L11 and L13. The comparator unit U7 selects the minimum of two SAD values and sends that minimum value on line L12. The comparator unit U7 also sends on line L14 the shift vector whose SAD value is outputted on line L12. Register U8 stores the minimum SAD value fed via line L12. The register U9 saves the shift vector fed on line L14. When the present block has been processed with all the shift vectors, the register U9 contains the shift vector that minimizes the SAD for the present block. This is the motion vector of the present block. The register U9 also sends on line L8 the value of the shift vector that it contains. Note that at the first step of the motion estimation process for the present block, the register U8 is set to a large value.

Figure 5A:
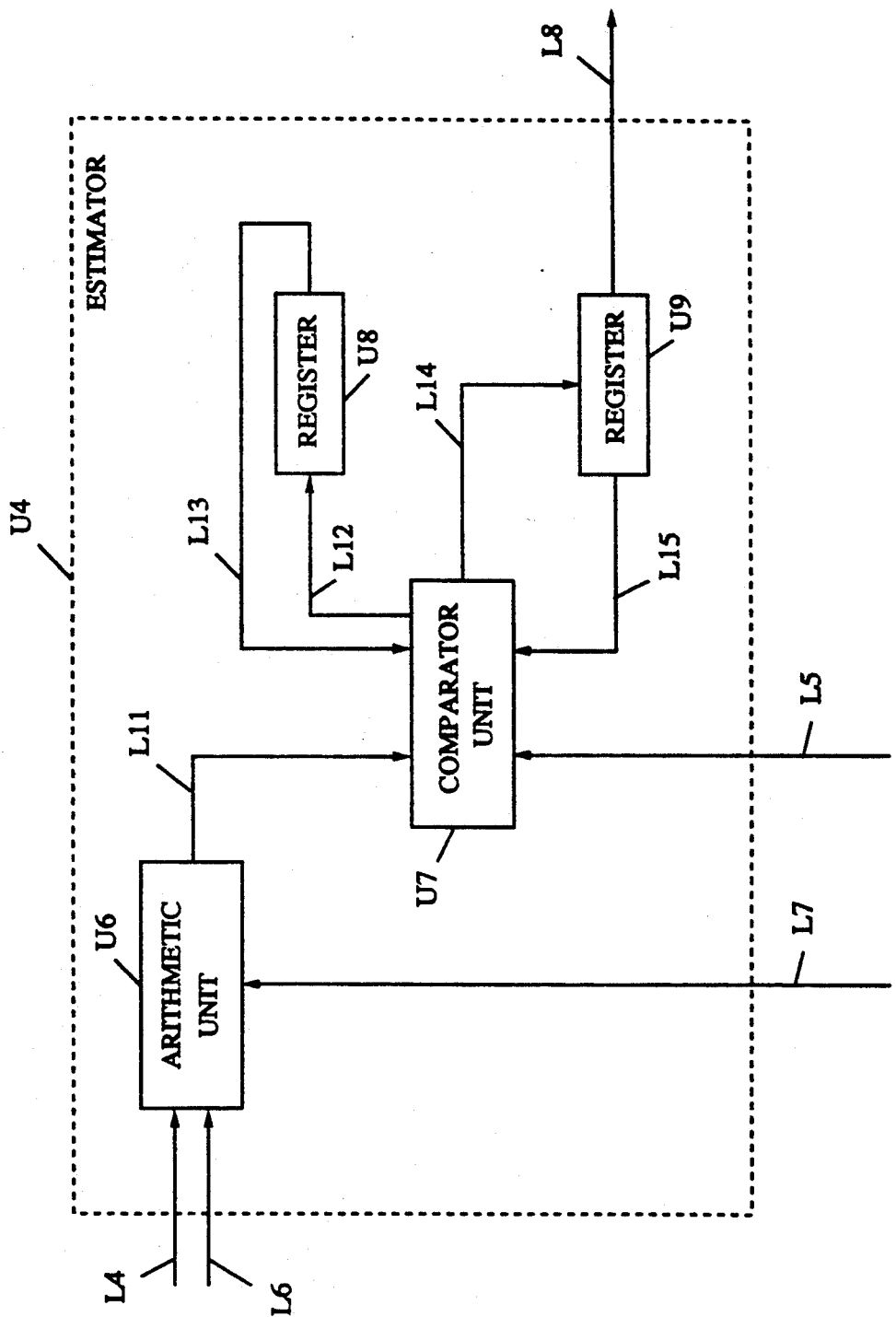
Figure 5B:
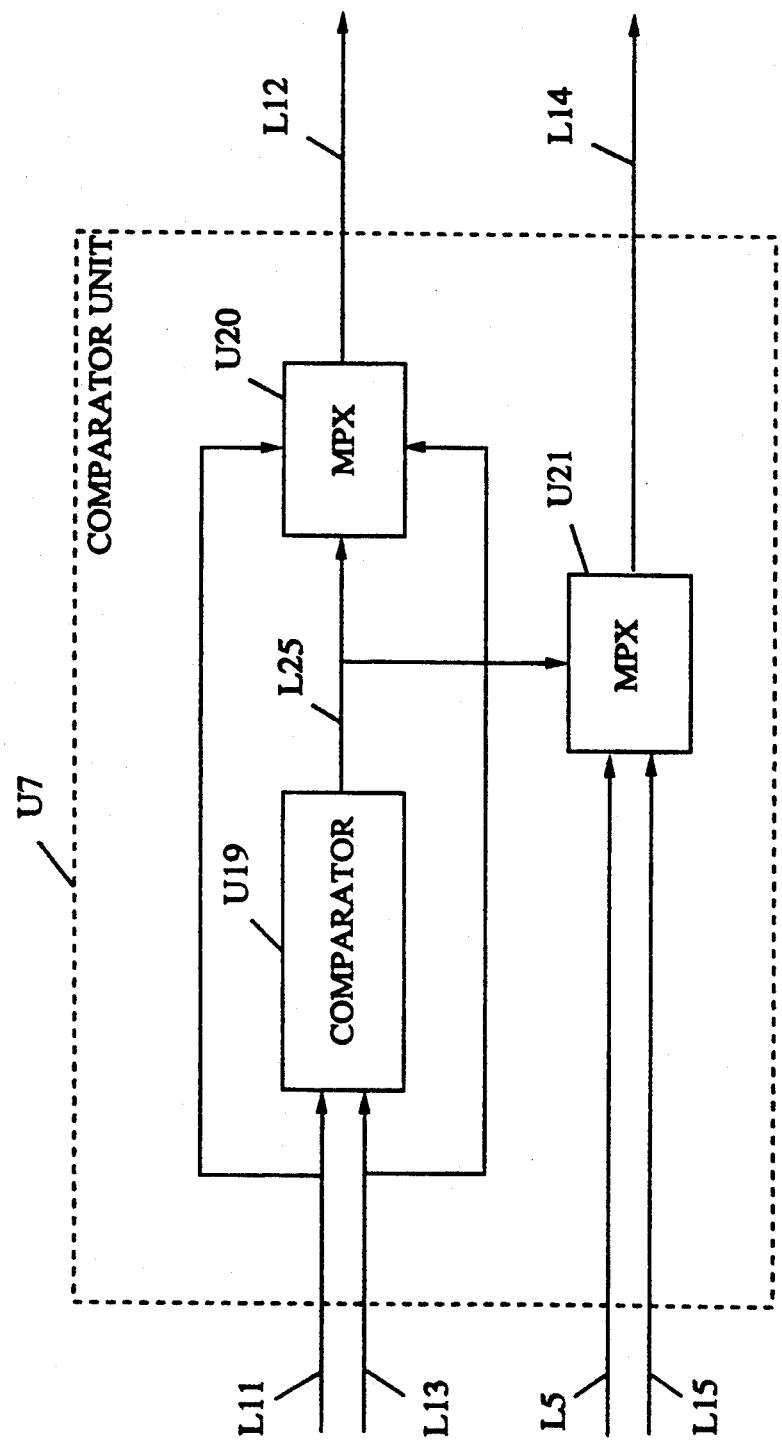

The function of the comparator unit U7 of FIG. 5A is described with reference to FIG. 5B. The comparator U19 receives on lines L11 and L13 the two SAD values to be compared. If the SAD value on line L11 is smaller than the SAD value on line L13, the comparator U19 sends, via line L25, a signal to the multiplexers U20 and U21 such that multiplexer U20 outputs on line L12 the signal received on line L11, and multiplexer U21 outputs on line L14 the signal received on line L5. If the SAD value on line L13 is smaller than the SAD value on line L11, comparator U19 sends, via line L25, a signal to multiplexers U20 and U21 such that they respectively output, on lines L12 and L14, the signals they receive on lines L13 and L15, respectively.

Figure 6:
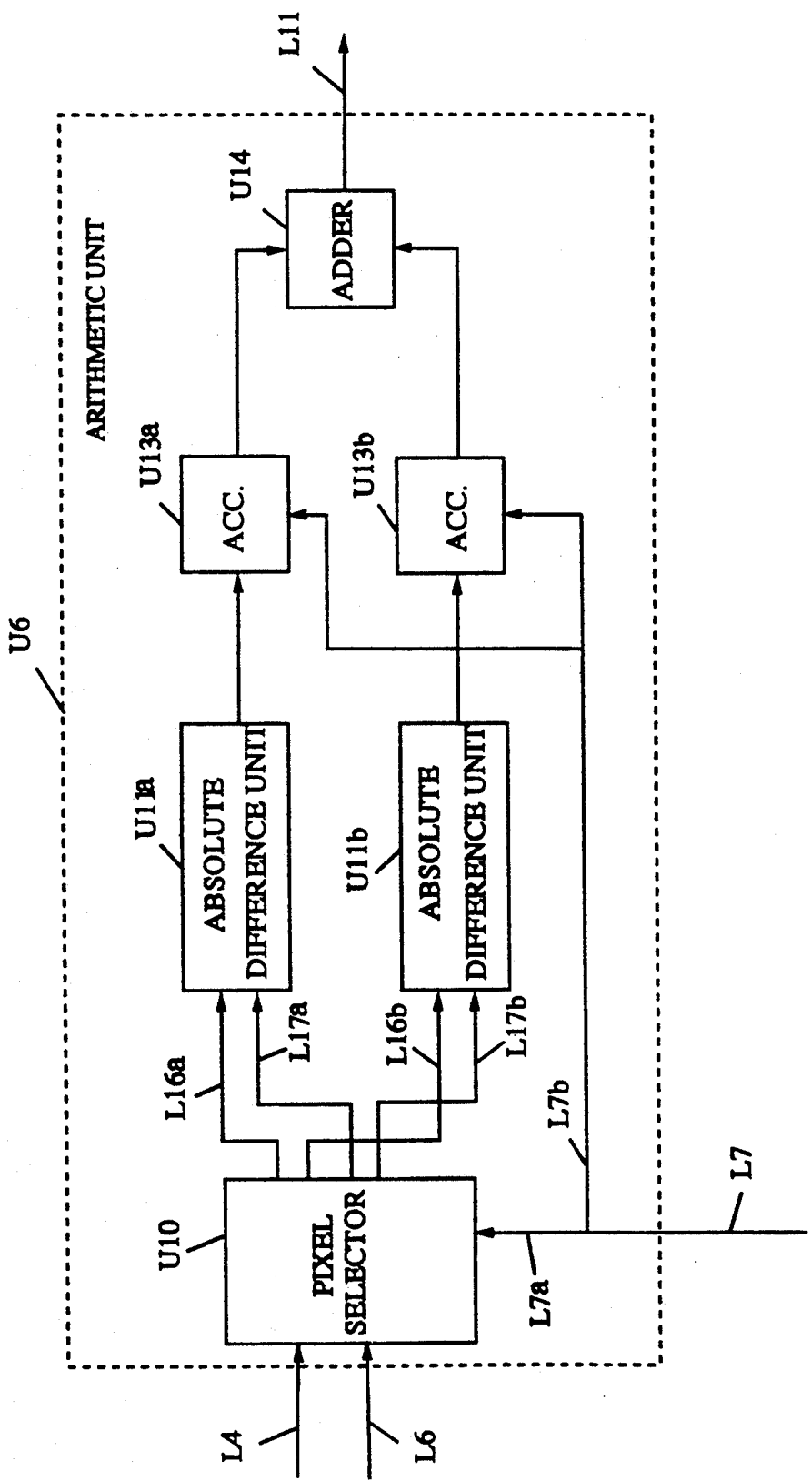

The function of the arithmetic unit U6 in FIG. 5 is described with reference to FIG. 6. The pixels of the present block are provided on line L4, and the pixels of the block from the preceding frame are provided on line L6 to the pixel selector U10. In the different motion estimation procedures of the invention, blocks of pixels are separated in categories. The category to which a block belongs determines which pixels of the blocks are used to compute the SAD. The pixel selector U10 receives on line L7a a signal that indicates which pixels of the present block (line L4) and of the block from the preceding frame (line L5) are used to compute the SAD. These pixels are outputted by the pixel selector U10 to the lines L16 and L17. Note that the pixel selector U10 can simply be a multiplexer board consisting of a plurality of multiplexers, for example. The pixels of the present block are outputted on lines L16a and L16b. The pixels of the block from the preceding frame are outputted on lines L17a and L17b. The embodiment presented here processes two pixels simultaneously. Other embodiments processing one pixel at a time or processing more than two pixels in parallel are also possible. The absolute difference unit U11a computes the absolute difference between the values on lines L16a and L17a. The absolute difference unit U11b does similarly for the values on lines L16b and L17b. The outputs of the absolute difference units U11a and U11b are then added to the content of the accumulators U13a and U13b. These accumulators U13a and U13b have to be cleared at the beginning of the computation of the SAD for each of the shift vectors. The signal fed to the accumulators U13a and U13b by line L7b indicates when to clear the accumulators. The outputs of the accumulators are fed to the adder U14. When all the pixels have been processed, the output of the adder is the SAD and is sent on line L11.

Figure 7:
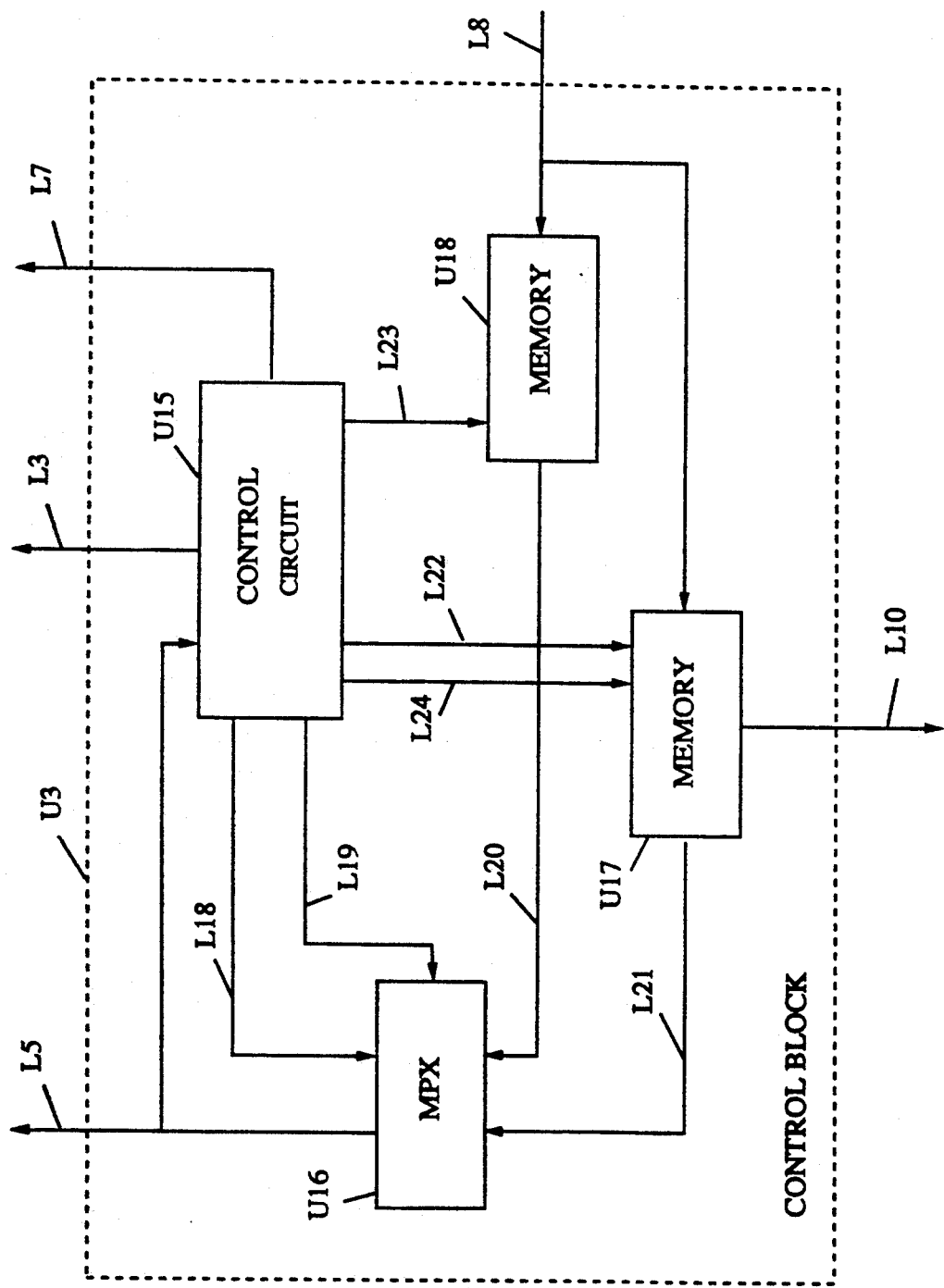
Figure 11:
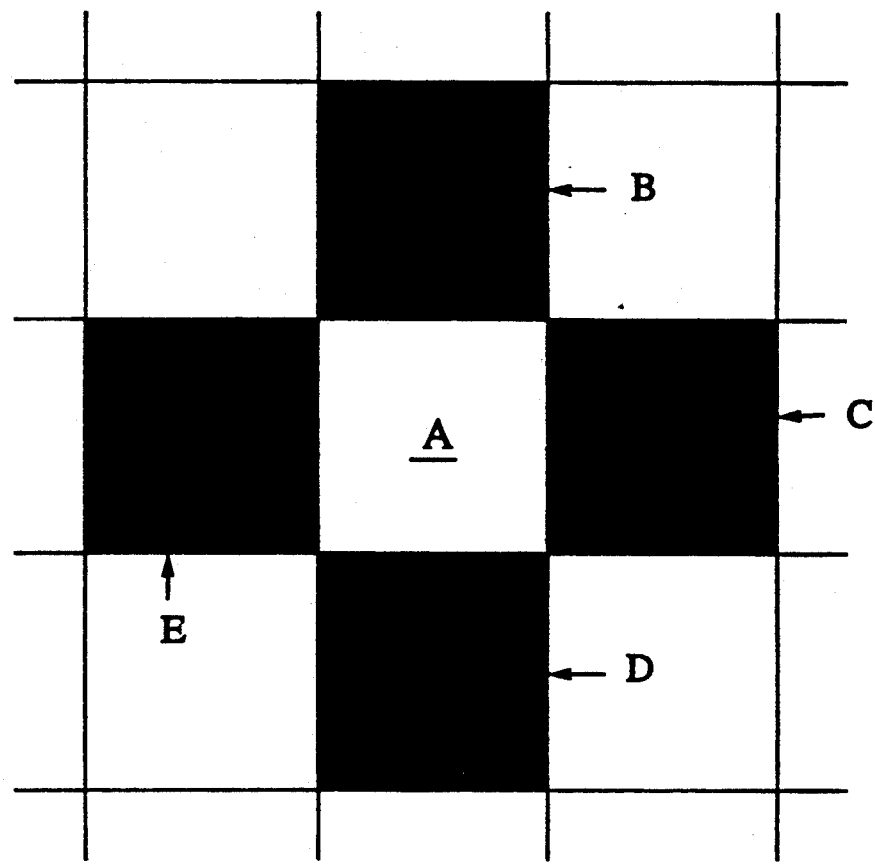
FIGS. 11 through 18 show various block and pixel patterns associated with different embodiments of the invention.
Figure 12:
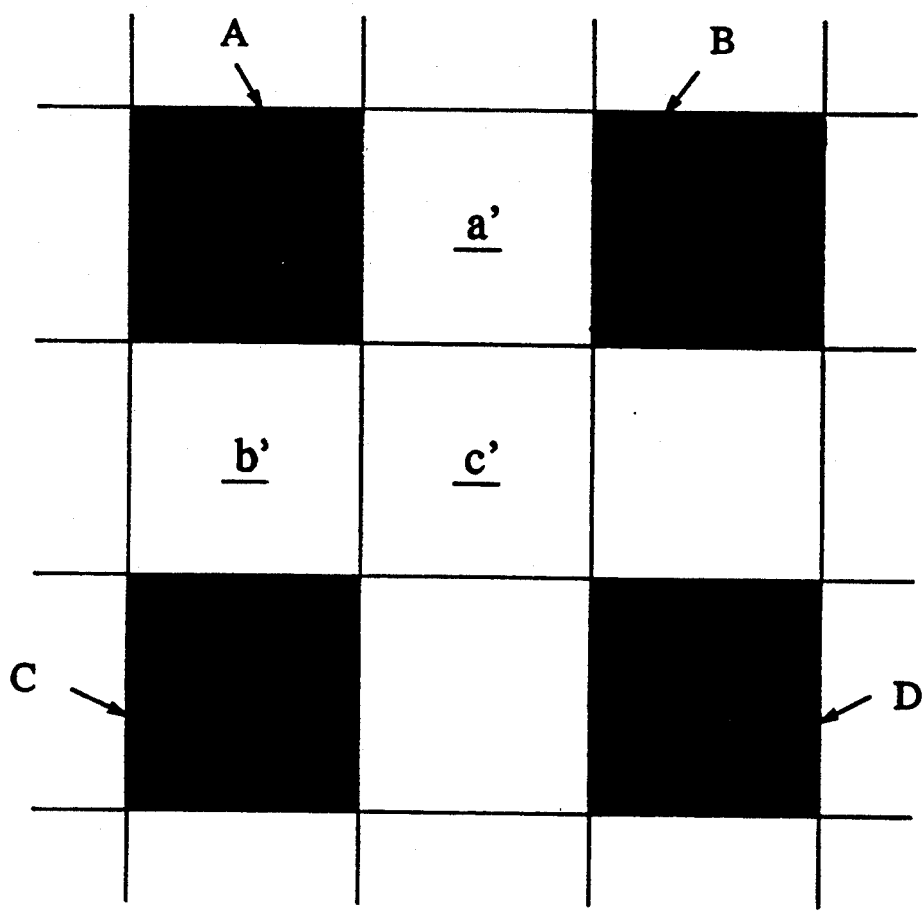
Figure 13:
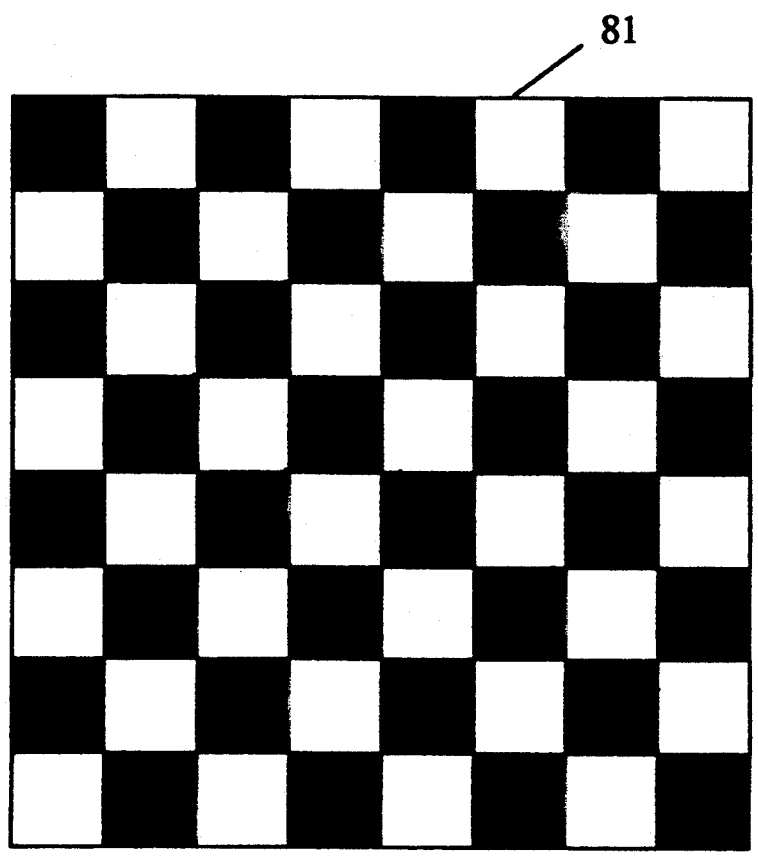
Figure 14:
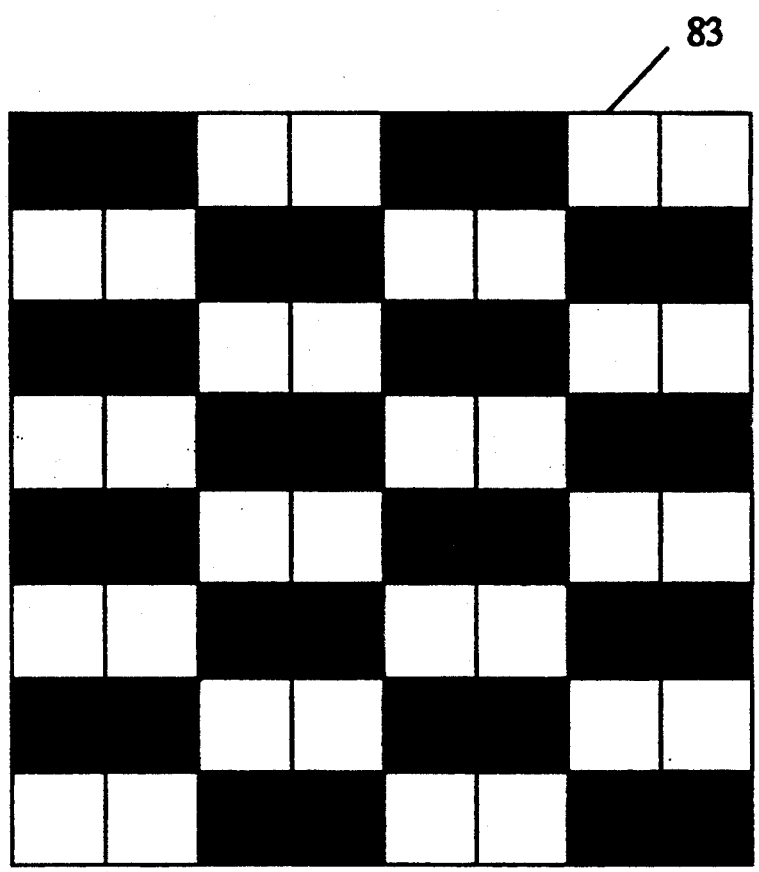

The function of the control block U3 in FIG. 4 is described with reference to FIG. 7. In the present invention, an image frame is divided into blocks of pixels, and these blocks are separated into two categories, dark and light shaded blocks. FIGS. 11 and 12 are examples of separating blocks into dark and light shaded blocks, designated herein as dark and light blocks, respectively. For each of the two block types, there are three options to estimate the motion vector of a block. Each of these options corresponds to a branch of the flowcharts of FIGS. 8, 9, and 10. Each of these branches in FIGS. 9 and 10 are terminated by a step indicating "estimate motion vector" of the block. Those steps are steps 51, 57 and 63 (see FIG. 9) for the dark blocks, and steps 71, 75 and 79 (see FIG. 10) for the light blocks.

The functions of the control block U3 when used to estimate the motion vector of a dark block will now be described. The motion vector of a dark block is estimated using all the possible shift vectors of the search area. There are three options specifying which pixels of a dark block are to be used to estimate its motion vector. Those options correspond to the branches, in the flowchart of FIG. 9, terminated by the steps 51, 57 and 63. The functions of the control block for each of these options will now be described.

The first option corresponds to the flowchart branch terminated by step 51 (see FIG. 9). For that option, all the pixels of the block are used to estimate its motion vector. The control circuit U15 sends on line L3 the address of the present block of pixels. The control circuit U15 sends on line L19 one of the shift vectors used to determine the motion vector of the present block. The signal sent on line L18 by the control circuit U15 is such that the signal fed on line L5 by the multiplexer U16 is the signal that the multiplexer receives on line L19. The control circuit U15 sends on line L7 the signal indicating that all the pixels of the block have to be used to compute the SAD. When all the possible shift vectors have been applied to the present block of pixels, the motion vector of the present block of pixels is received on line L8, stored in memory U17 and fed to line L10.

The second option corresponds to the flowchart branch terminated by step 57 (see FIG. 9). For that option, only the pixels specified by sparse pixel patterns are used to estimate its motion vector. The control circuit U15 sends on line L3 the address of the present block of pixels. The control circuit U15 sends on line L19 one of the shift vectors used to determine the motion vector of the present block. The signal sent on line L18 by the control circuit U15 is such that the signal fed on line L5 by the multiplexer U16 is the signal that the multiplexer receives on line L19. The control circuit U15 sends on line L7 the signal indicating that only the pixels of a given sparse pixel pattern are used to compute the SAD. FIGS. 13, 14, 15 and 16 give some sparse pixel patterns that can be used for this purpose. When all the possible shift vectors have been applied to the present block of pixels, the motion vector of the present block of pixels is received on line L8, stored in memory U17, and outputted to line L10.

Figure 17:
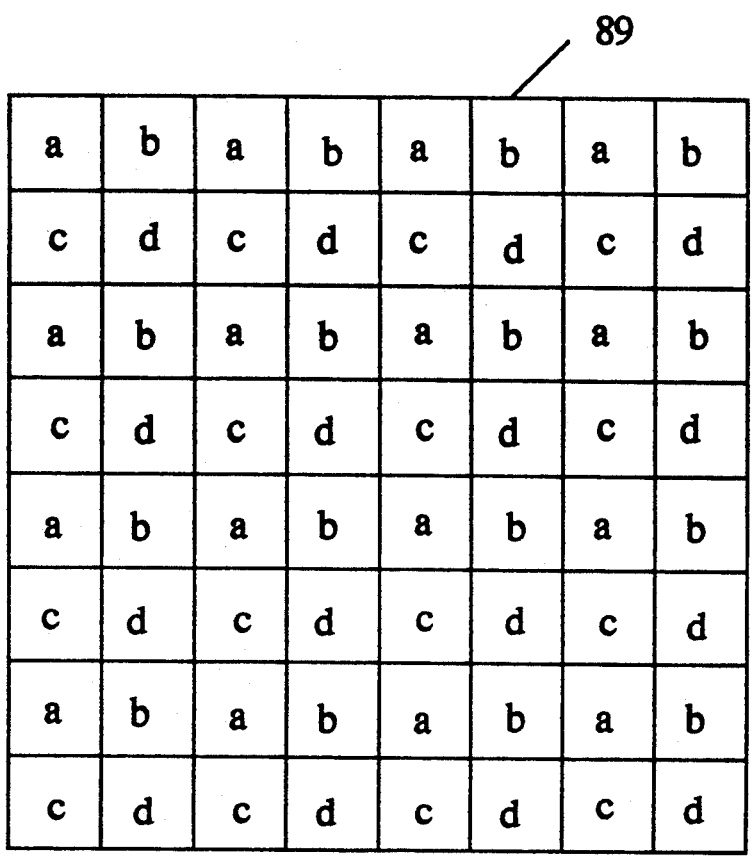

The third option corresponds to the flowchart branch terminated by step 63 (see FIG. 9). In this case, the motion vector of a dark block is estimated using alternately several sparse pixel patterns for the different shift vectors. In this example, the four sparse pixel patterns of FIG. 17 are used, as is the alternating schedule of FIG. 18. The control circuit U15 first sends on line L3 the address of the present block of pixels. The control circuit U15 then sends on line L7 the signal indicating that only the pixels of the first sparse pixel pattern have to be used to compute the SAD. The control circuit U15 then sends on line L19 one of the shift vectors designated to be used with the first sparse pixel pattern. The signal sent on line L18 by the control circuit U15 is such that the signal fed on line L5 by the multiplexer U16 is the signal that the multiplexer U16 receives on line L19. When all the shift vectors designated to be used with the first sparse pixel pattern have been applied to the present block, the shift vector received on line L8 is the motion vector for the first sparse pixel pattern. That shift vector is then stored in memory U18. The process is similar for the other three sparse pixel patterns. When the process for the four sparse pixel patterns is completed, the motion vectors obtained with the four sparse pixel patterns are stored in memory U18. Next, the control circuit U15 sends on line L7 the signal indicating that all the pixels of the blocks are now to be used to compute the SAD. The control circuit U15 also sends on line L23 the address of the motion vector obtained with one of the sparse pixel patterns. The memory U18 sends on line L20 the motion vector whose address is received on line L23. The signal sent on line L18 by the control circuit is such that the signal fed on line L5 by the multiplexer U16 is the signal that the multiplexer U16 receives on line L20. When all the motion vectors corresponding to the four sparse pixel patterns have been applied to the present block of pixels, the shift vector received on line L8 is the motion vector of the present block. The motion vector is stored in memory U17 and fed to line L10.

The functions of the control block U3 as used to estimate the motion vector of a light block will now be described. The motion vector of a light block is estimated using the motion vectors of predetermined neighboring dark blocks. There are three options specifying how to determine the motion vector of a light block from the motion vectors of these neighboring dark blocks. Those options correspond to the branches, in the flowchart of FIG. 10, terminated by the steps 71, 75, and 79. The functions of the control block for each of these options will now be described.

The first option corresponds to the flowchart branch terminated by step 71 (see FIG. 10). For that option, the motion vector of a light block is solely determined from the motion vectors of predetermined neighboring dark blocks. The motion vectors of these dark blocks have been previously determined. The control circuit U15 sends on line L22 the address of one of the predetermined neighboring dark blocks of the present light block. The memory U17 sends on line L21 the motion vector of the block whose address is fed on line L22. The signal sent on line L18 by the control circuit is such that the signal fed on line L5 by the multiplexer U16 is the signal that the multiplexer receives on line L21. The control circuit U15 receives via line 5 that motion vector. When all the motion vectors of the predetermined neighboring dark blocks that have to be considered have been received by the control circuit, the control circuit U15 determines the motion vector of the light block using a predetermined procedure. For example, this predetermined procedure can simply consist of computing the average of the motion vectors of the neighboring dark blocks. The control circuit then sends on line L24 that motion vector, and on line L22 the address of the present light block. The memory U17 stores the motion vector received on line L24 at the address given on line L22 and also sends that vector on line L10.

The second option corresponds to the flowchart branch terminated by step 75 (See FIG. 10.). For that option, all the pixels of the light block are used to determine its motion vector. The control circuit U15 sends on line L3 the address of the present block of pixels. The control circuit U15 also sends on line L7 a signal indicating that all the pixels of the block have to be used to compute the SAD. The control circuit U15 sends on line L22 the address of one of the predetermined neighboring dark blocks of the present light block. The motion vector of that neighboring dark block has been previously determined. The memory U17 sends on line L21 the motion vector of the block whose address is fed on line L22. The signal sent on line L18 by the control circuit U15 is such that the signal fed on line L5 by the multiplexer U16 is the signal that the multiplexer receives on line L21. When all the motion vectors of the predetermined neighboring dark blocks that have to be considered have been applied to the present block of pixels, the motion vector of the present block of pixels is received on line L8, stored in memory U17 and fed to line L10.

The third option corresponds to the flowchart branch terminated by step 79 (See FIG. 10.). For that option, only the pixels of the light block specified by a sparse pixel pattern are used to determine its motion vector. The control circuit U15 sends on line L3 the address of the present block of pixels. The control circuit also sends on line L7 the signal indicating that only the pixels of given sparse pixel pattern have to be used to compute the SAD. The control circuit sends on line L22 the address of one of the predetermined neighboring dark block of the present light block. The motion vector of that neighboring dark block has been previously determined. The memory U17 sends on line L21 the motion vector of the block whose address is fed on line L22. The signal sent on line L18 by the control circuit U15 is such that the signal fed on line L5 by the multiplexer U16 is to the signal that the multiplexer receives on line L21. When all the motion vectors of the predetermined neighboring dark blocks that have to be considered have been applied to the present block of pixels, the motion vector of the present block of pixels is received on line L8, stored in memory U17 and fed to line L10. Note that the control circuit U15 can be hardwired logic or a microprocessor, for example.

TABLE 1

| Arrangement Number | Terminating step | | |
|---|---|---|---|
| | Flowchart 40 | Flowchart 48 | Flowchart 64 |
| 100 | 43 | 51 | |
| 200 | 43 | 57 | |
| 300 | 43 | 63 | |
| 400 | 47 | 51 | 71 |
| 500 | 47 | 51 | 75 |
| 600 | 47 | 51 | 79 |
| 700 | 47 | 57 | 71 |
| 800 | 47 | 57 | 75 |
| 900 | 47 | 57 | 79 |
| 1000 | 47 | 63 | 71 |
| 1100 | 47 | 63 | 75 |
| 1200 | 47 | 63 | 79 |

Figure 8:
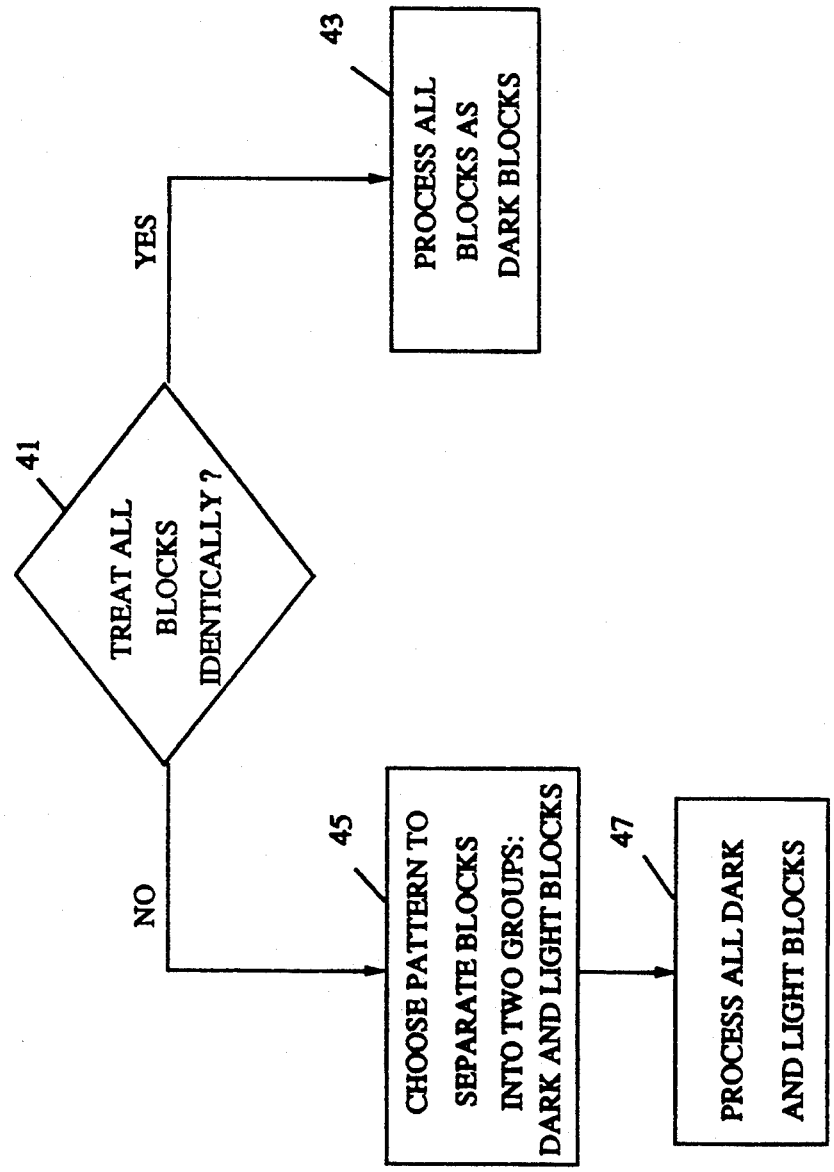
FIGS. 8 through 10 are flowcharts of various embodiments of the invention.
Figure 9:
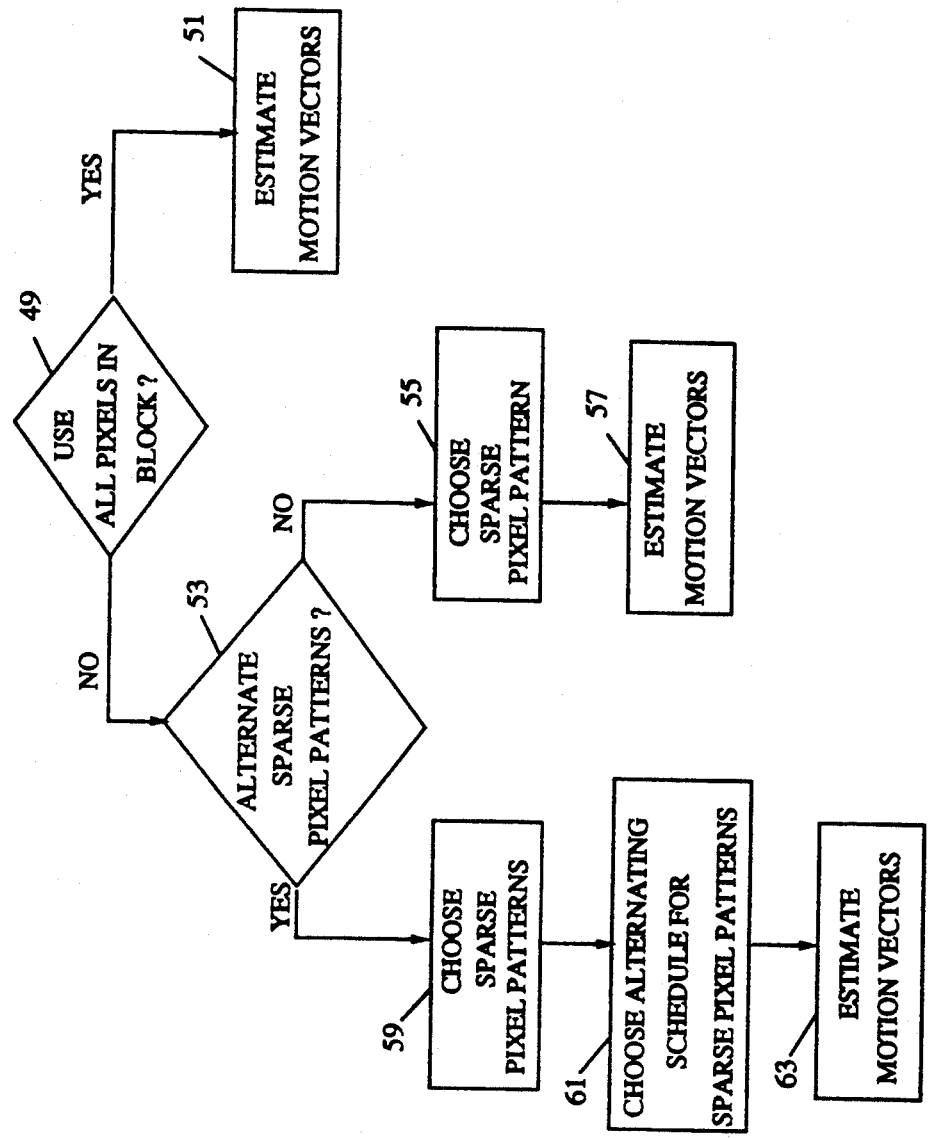
Figure 10:
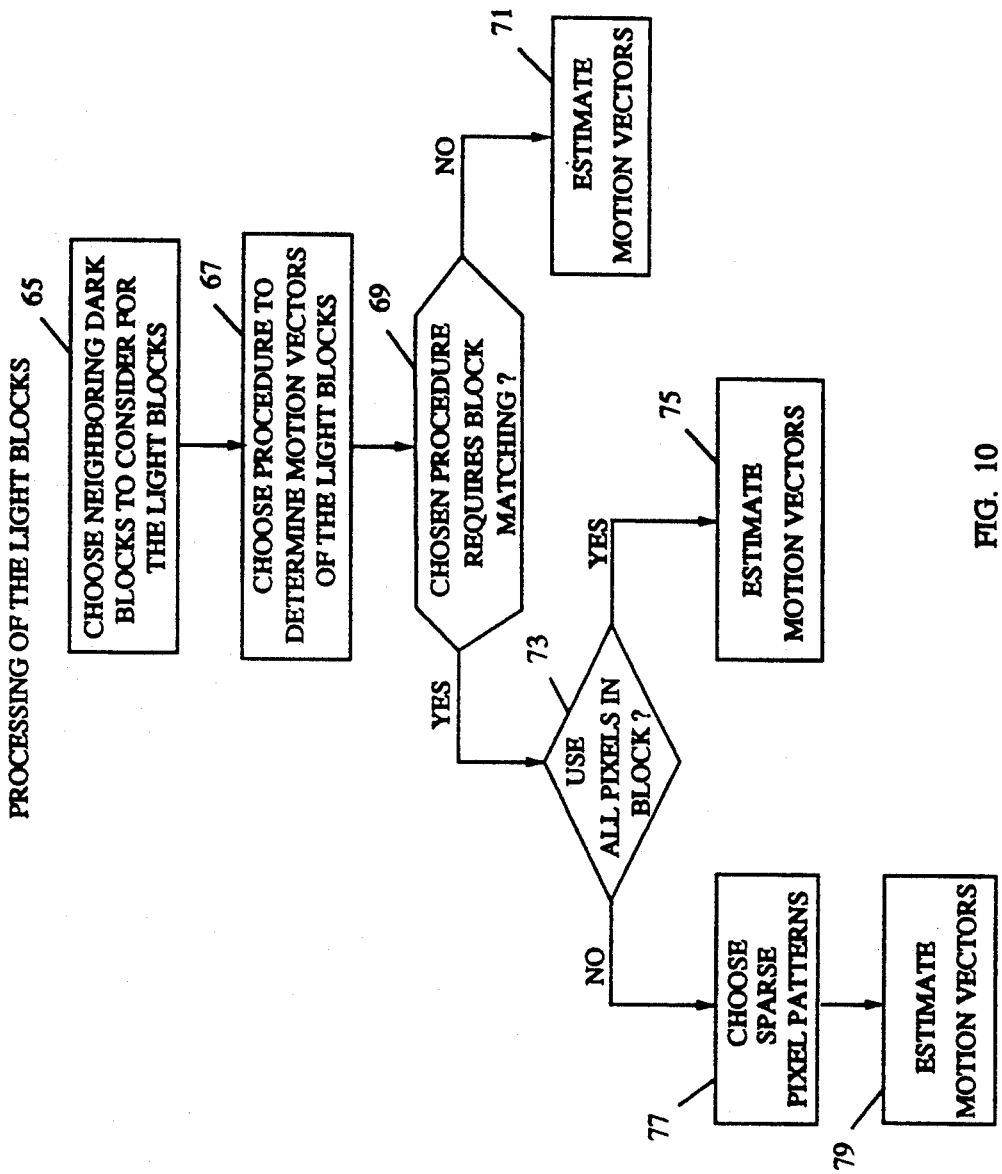

FIGS. 8 through 10, previously briefly discussed, are flowcharts that show program arrangements for various embodiments of the invention. Table 1 gives the different combinations that can be obtained by going through the three flowcharts 40, 48, and 64.

Each of the arrangements are specified by the branch taken in each of the three flowcharts. The steps 43, 47, 51, 57, 71, 75 and 79 are the "terminating" steps of each of the branches and will be used to represent them. The arrangements given in Table 1 are all the possible combinations of the terminating steps. The different arrangements are illustrated below by describing each of the branches that can be taken in the three flowcharts.

The branches terminated by steps 43 and 47 (see FIG. 8) specify if the blocks of a frame are to be processed identically or not. When step 43 is part of an arrangement, the motion vectors of all the blocks are determined in the same manner. These blocks are labeled as dark blocks. When step 47 is part of an arrangement, the blocks are separated into two groups, the dark blocks and the light blocks. The motion vectors of the dark blocks and the light blocks are then determined in a different manner. FIGS. 11 and 12 show two examples of how blocks can be divided into dark and light blocks.

Figure 18:
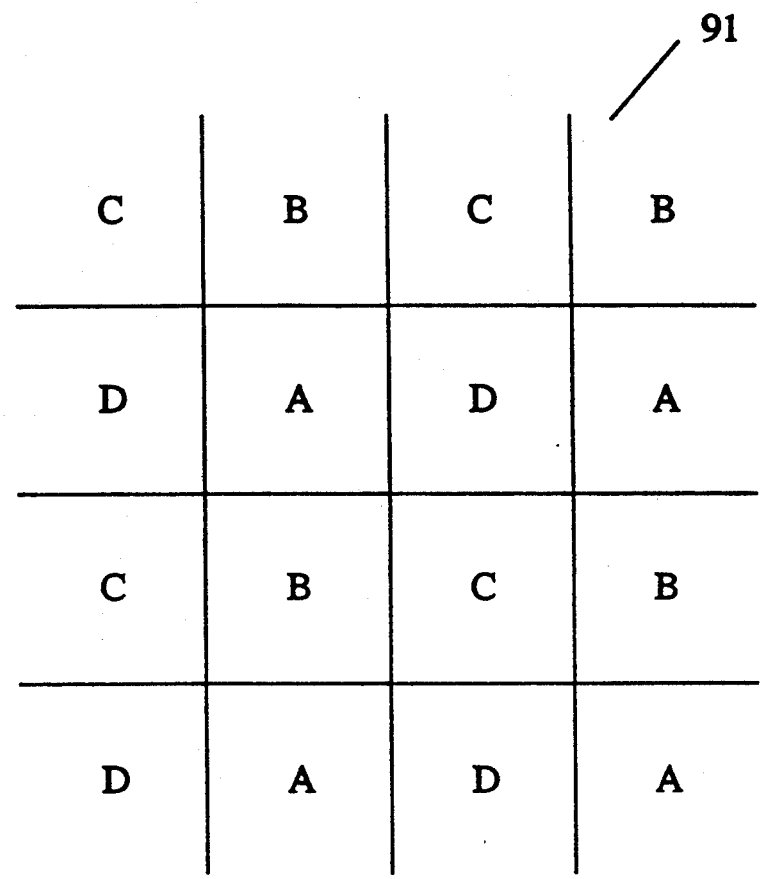

The branches terminated by steps 51, 57 and 63 (see FIG. 9) specify how to process the dark blocks. When step 51 is part of an arrangement, all the pixels of a dark block are to be used to determine its motion vector. When step 57 is part of an arrangement, only a predetermined fraction of the pixels of a dark block are to be used to determine its motion vector. The fraction of the pixels to be used is identified as a sparse pixel pattern. FIGS. 13, 14, 15 and 16 show some examples of sparse pixel patterns. When step 63 is part of an arrangement, predetermined fractions of the pixels of a dark block are used alternately over the search area to determine its motion vector. FIG. 17 shows an example of four sparse pixel patterns that can be used alternately over the search area; the pixels identified as "a" define one pattern, the pixels identified as "b" define another one, and similarly for the pixels identified as "c" and "d". FIG. 18 shows how these four sparse pixel patterns can be used alternately over the search area. Blocks "A" indicate search locations where the sparse pixel pattern "a" is used; blocks "B" indicate search locations where the sparse pixel pattern "b" is used, and so on for blocks "C" and "D".

The branches terminated by the steps 71, 75, and 79 (see FIG. 10) specify how to process the light blocks. When step 71 is part of an arrangement, motion vector of a light block is solely determined from the motion vector of the neighboring dark blocks. For example, in FIG. 11, block "A" is a light block. Blocks "B", "C", "D", and "E" are the neighboring dark blocks from which the motion vector of block "A" is to be determined. The motion vector of block "A" can simply be the motion vector equal to the average of the motion vectors of blocks "B", "C", "D", and "E". When step 75 is part of an arrangement, the motion vector of a light block is determined from the motion vector of the predetermined neighboring black blocks, and uses all the pixels of the light block. For example, in FIG. 12, the motion vector of block "a'" can be determined as follows. The light block "a'" is matched to the two blocks in the previous frame whose locations are determined by the motion vectors of blocks "A" and "B". The matching is done using all the pixels of the light block. When step 79 is part of an arrangement, the motion vector of a light block is determined from the motion vector of the predetermined neighboring black blocks and from a predetermined fraction of the pixels of the light block. That fraction of the pixels of the light block is given by a sparse pixel pattern. For example, in FIG. 12, the motion vector of block "b'" can be determined as follows. We match the light block "b'" to the two blocks in the previous frame whose locations are determined by the motion vectors of blocks "A" and "C". The matching is accomplished using only the dark pixels of the sparse pattern of FIG. 13, for example.

Arrangement 100 consists in estimating the motion vectors of all the blocks identically. For each block, all the pixels of the block are employed in the computation. This arrangement corresponds to a standard block matching algorithm.

Arrangement 200 of one embodiment of the invention consists in estimating the motion vectors of all the blocks identically. For each block, the same predetermined fraction of the pixels of the block are used to determine its motion vector. The fraction of the pixels to be used is determined by a sparse pixel pattern. The term subsampling of pixels is understood in the literature to mean a uniform pattern of the pixels, such as the one in FIG. 13, where every other pixel is used. Use of a sparse pixel pattern is more general. It includes the pattern of FIG. 16, which is not a uniform pattern and is not taken to be subsampling in the usual sense of the terminology. All of the other arrangements are illustrative of other embodiments of the invention.

As an example, arrangement 1100 (see Table 1) will now be described using specific dark and light blocks and sparse pixel patterns.

First, notation must be established. Assume that a frame is made of V lines and that there are H pixels per line. Line 0 is the top line in the frame and pixel 0 is the leftmost pixel on each line. A block of pixels has M*N pixels, i.e. M pixels on each of the N lines. A block of pixels is designated by its upper left coordinate, i.e. $B(i,j)$ is a block consisting of the pixels $j, j+1, j+2, \ldots, j+M-1$ on the lines $i, i+1, i+2, \ldots, i+N-1$.

The arrangement 1100 uses the branch terminated by step 47 (see FIG. 8). Step 45 of that branch separates the blocks of pixels into dark and light blocks. As an example, use FIG. 11 as the pattern for separating the blocks of the frame into dark and light blocks. The dark blocks are the blocks with coordinates $B(2Nk,2Mr)$ and $B(N(2k+1), M(2r+1))$ for $k=0,1,\ldots,V/(2N)-1$ and for $r=0,1,\ldots,H/(2M)-1$. The light blocks are the blocks with coordinates $B(2Nk,M(2r+1))$ and $B(N(2k+1),2Mr)$ for $k=0,1,\ldots,V/(2N)-1$ and for $r=0,1,\ldots,H/(2M)-1$. As step 47 indicates, the dark and light blocks are processed in that step.

Arrangement 1100 uses the branch terminated by step 63 (see FIG. 9) to process the dark blocks. Step 59 in that branch, indicates one must first choose sparse pixel patterns in order to process the dark blocks. In this example, please refer to the four sparse patterns of FIG. 17. Let $B(i,j)$ be the dark block for which a motion vector is to be estimated. The sparse pixel pattern "a" is made of the pixels $B(i+k,j+r)$ for k and r even, and for k strictly less than N and r strictly less than M. The sparse pattern "b" is made of the pixels $B(i+k,j+1+r)$ for k and r even, for k strictly less than N, and for r strictly less than $M-1$. The sparse pattern "c" is made of the pixels $B(i+1+k,j+r)$ for k and r even, for k strictly less than $N-1$, and for r strictly less than M. The sparse pattern "d" is made of the pixels $B(i+1+k,j+1+r)$ for k and r even, for k strictly less than $N-1$, and for r strictly less than $M-1$.

Figure 19A:
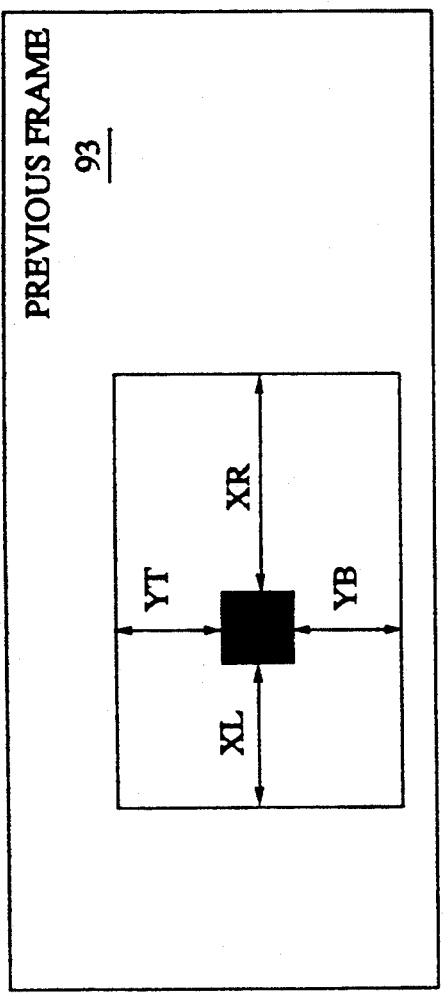
FIGS. 19A and 19B are block diagrams illustrative of measuring techniques involved in various embodiments of the invention.
Figure 19B:
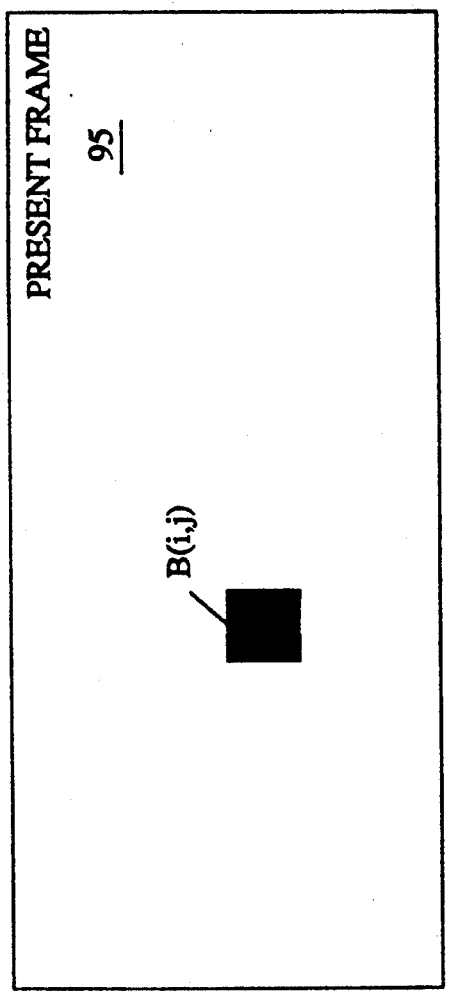

Step 61 of the branch specifies an alternating schedule for the sparse pixel patterns. In this example, use the alternating schedule of FIG. 18. The four sparse pixel patterns described in the preceding paragraph are alternately used over the search area using the schedule of FIG. 18. For this case, assume that the search area covers motion of YT pixels up, YB pixels down, XL pixels left and XR pixels right. That search area for the block $B(i,j)$ is shown in FIGS. 19A and 19B. The search area consists of the locations $(i-YT+k, j-XL+r)$ for $k=0,1,2,\ldots,YB+YT$ and for $r=0,1,2,\ldots,XL+XR$.

The locations of the search area are given as a reference to the upper left coordinate of the block.

The alternating schedule can then be described as follows. The sparse pixel pattern "a" is used over the locations $(i-YT+k,j-XL+r)$ for k and r even, k strictly less than $YB+YT+1$, and r strictly less than $XL+XR+1$. The sparse pixel pattern "b" is used over the locations $(i-YT+k+1, j-XL+r)$ for k and r even, k strictly less than $YB+YT$ and r strictly less than $XL+XR+1$. The sparse pixel pattern "c" is used over the locations $(i-YT+k+1,j-XL+r+1)$ for k and r even, k strictly less than $YB+YT$ and r strictly less than $XL+XR$. The sparse pixel pattern "d" is used over the locations $(i-YT+k,j-XL+r+1)$ for k and r even, k strictly less than $YB+YT+1$ and r strictly less than $XL+XR$.

The motion vector of the dark block $B(i,j)$ (step 63 of FIG. 9) can now be determined. Using the search locations described in the previous paragraph, determine by block matching a motion vector for each of the sparse pixel patterns. For these four locations and using all the pixels of the block, then determine by block matching the motion vector of the dark block $B(i,j)$. One proceeds similarly for the other dark blocks.

The third flowchart (FIG. 10) specifies how to process the light blocks. In step 65, the neighboring dark blocks used to determine the motion vectors of the light blocks are chosen. FIG. 11 shows the dark blocks "B", "C", "D", and "E" used in this example as the neighboring blocks of the light blocks. The motion vector of light block "A" is determined from the motion vectors of blocks "B", "C", "D", and "E". For this example, one chooses in step 67 to determine the motion vector by block matching; and in step 73, to use all the pixels of the light blocks. At step 75, all the light blocks according to the specified parameters are processed. Specifically, this means that for a light block with coordinates $B(i,j)$, one determines its motion vector by block matching using the locations determined by the motion vectors of the neighboring dark blocks $B(i-N,j)$, $B(i+N,j)$, $B(i,j-M)$ and $B(i,j+M)$. The block matching is performed using all the pixels of the block.

Figure 20:
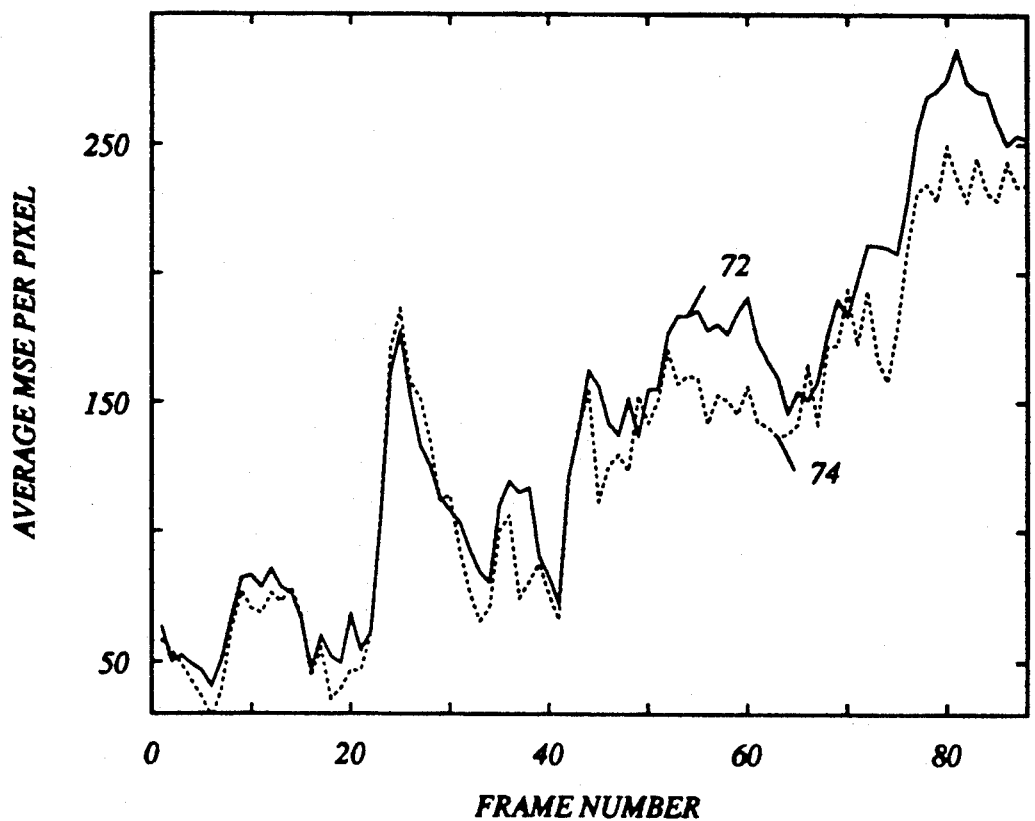
FIGS. 20 through 22 show simulations of curves of average mean square error (MSE) per pixel obtained for successive frames of a video sequence known as the tennis sequence, from known exhaustive search techniques, and various embodiments of the invention, respectively.

In FIG. 20, curves are shown for comparing the average MSE per pixel of motion-compensated frames produced by one embodiment of the invention, and the known exhaustive search technique for frames of the video sequence known as the tennis sequence. Blocks of 16-by-16 pixels were used. Curve 72 represents a plot derived from the known exhaustive search technique, in which all of the blocks in a current frame are searched throughout search areas of a previous frame, for obtaining motion vectors, as previously described. Curve 74 represents a plot derived from an embodiment of the invention using the block pattern 70 of FIG. 12. Note that with reference to FIG. 12, the motion vectors were obtained by exhaustive search for the dark blocks "A" through "D", and interpolating or estimating the motion vectors for the light blocks non-exhaustively searched through use of the motion vectors obtained for neighboring blocks thereto for unsearched blocks such as a', b', and c', respectively. The computer simulation shown in FIG. 20 is for the first 90 frames of tennis sequence. As shown, curve 74 obtained for one embodiment of the invention closely approaches the results obtained from the exhaustive search technique known in the art. The embodiment of the invention from which curve 74 is obtained requires only 25.0% of the computation of the exhaustive search technique.

Figure 15:
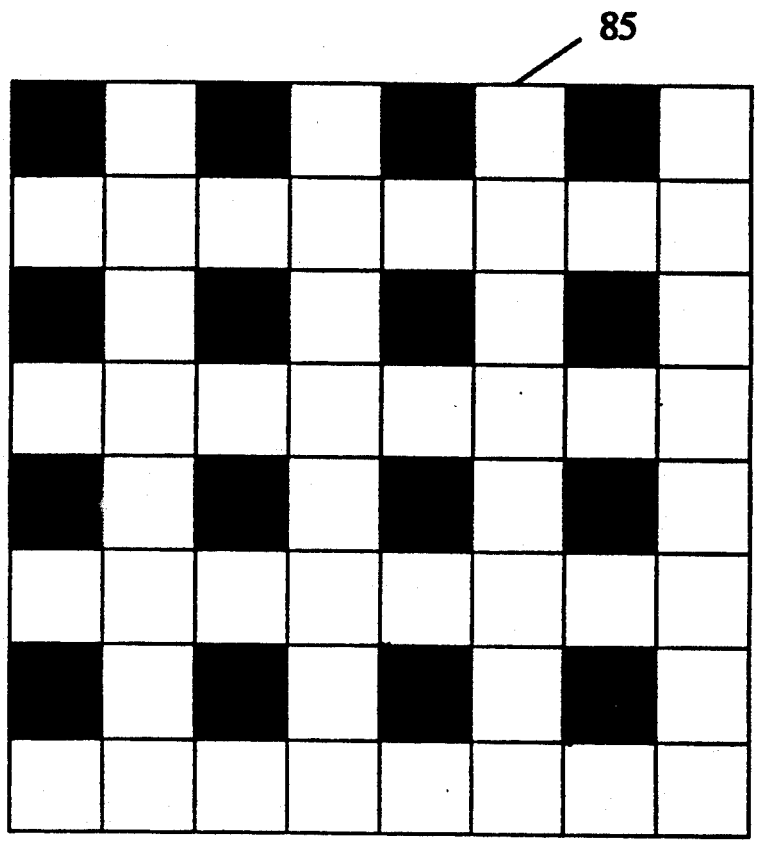
Figure 16:
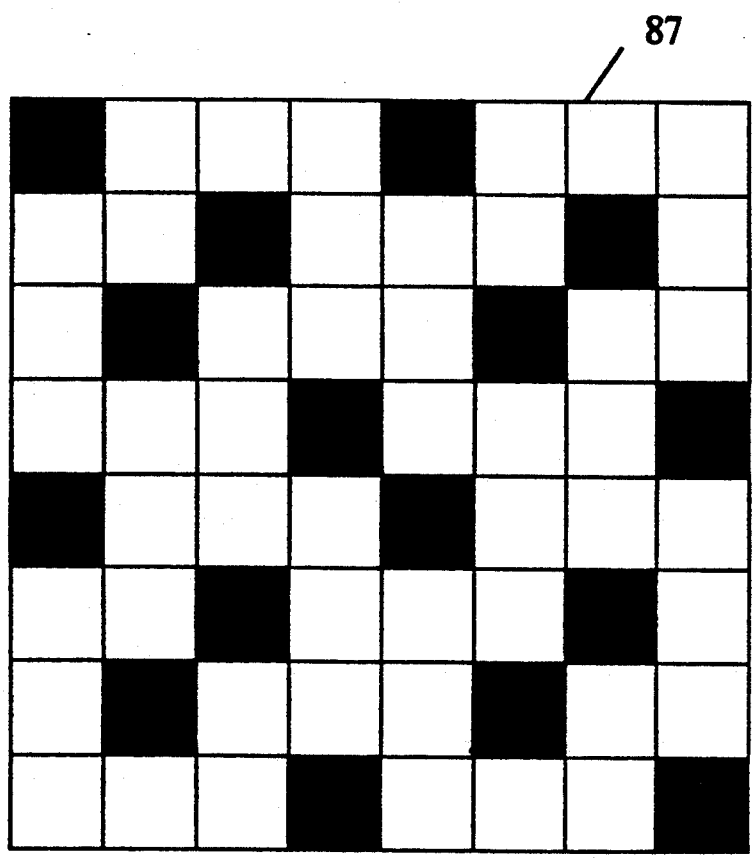
Figure 21:
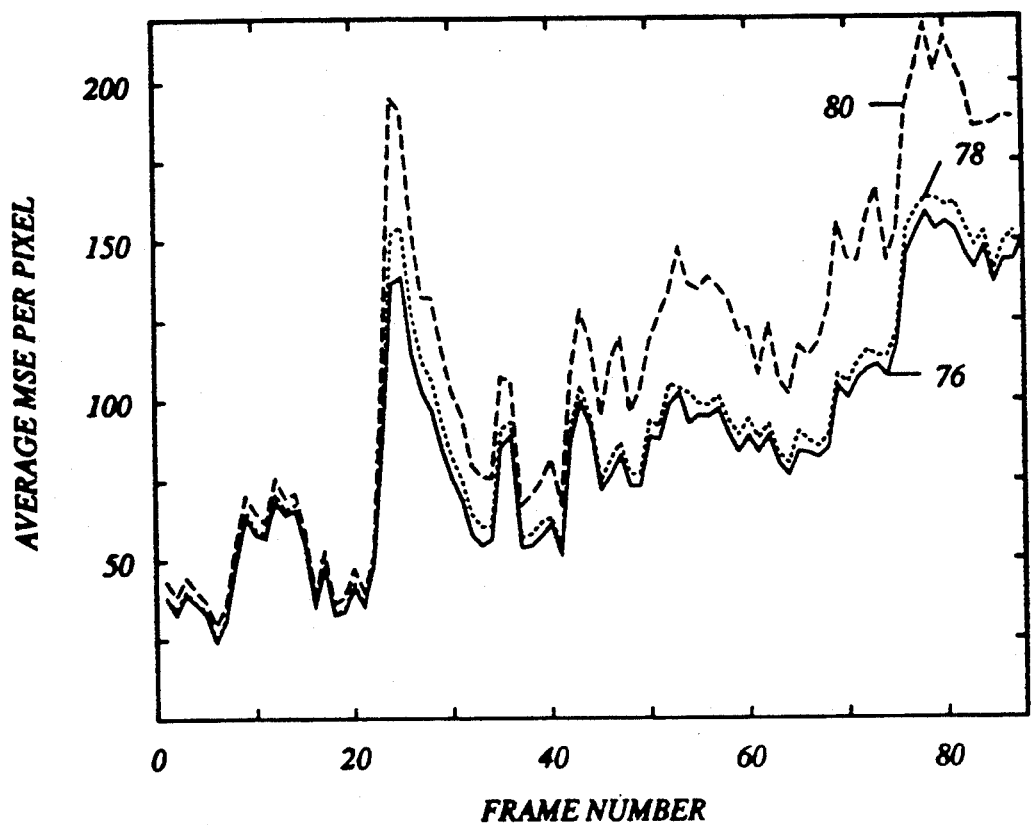

In FIG. 21, a computer simulation is shown for frames of the tennis sequence relative to the plotting of a known exhaustive search shown by curve 76; to an embodiment of the invention using the sparse pixel pattern 89 of FIG. 17 in combination with the alternating schedule of sparse pixel patterns 91 of FIG. 18, resulting in curve 78; and to another embodiment of the invention using the sparse pixel pattern 85 of FIG. 15 for producing the result shown by curve 80. In this example, blocks of 8-by-8 pixels were used. Note that the results of curve 78 of an embodiment of the invention shows an average MSE comparable to the exhaustive search results shown by curve 76.

Figure 22:
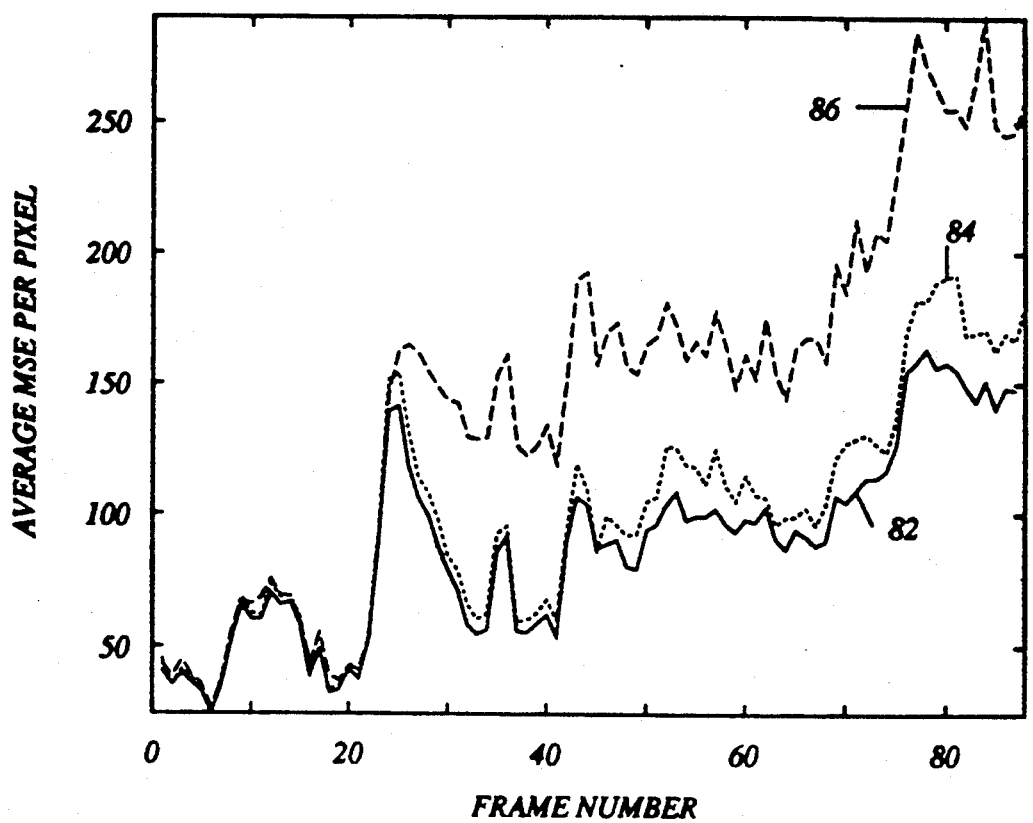

In FIG. 22, the results of a computer simulation using two known techniques, and techniques of the present invention are shown. In this example, blocks of 8-by-8 pixels were used. Curve 86 shows the results obtained using the triple search technique taught in U.S. Pat. No. 4,371,895, and discussed in the Background Of The Invention. Curve 82 was obtained using the exhaustive full block search technique. Curve 84 was obtained for an embodiment of the invention using the block pattern 68 of FIG. 11, in combination with the pixel pattern 89 of FIG. 17 and the alternating schedule of pixel patterns 91 of FIG. 18. Note that the curve 84 of this embodiment of the invention compares very favorably to curve 82 obtained from the known exhaustive search technique. All of these curves were obtained from 90 frames of the tennis sequence.

As previously described, with reference to FIGS. 11 through 18, various embodiments of the invention may be combined in different combinations. For example, one of the block patterns 68 or 70 of FIGS. 11 and 12, respectively, can be combined with one of the sparse pixel patterns 81, 83, 85, 87, or 89 of FIGS. 13 through 17, respectively, in either a non-alternating schedule or in an alternating schedule 91 as shown in FIG. 18, for example, for obtaining motion vectors in an imaging system with reduced computation.

Although various embodiments of the invention have been illustrated and described herein, they are not meant to be limiting. Those of skill in the art may recognize modifications to these various embodiments, which modifications are meant to be covered by the spirit and scope of the claims appended hereto. For example, many other block patterns, sparse pixel patterns and alternating schedule for given sparse pixel patterns can be devised for use in the present invention.

What is claimed is:

1. A method for determining motion vectors in an imaging system producing successive frames and/or fields each of a lattice of pixels, said method comprising the steps of:

dividing each frame or field into blocks of pixels;

forming a pattern of first and second groups of said blocks for each of said frames or fields;

selecting one of said first and second groups of said blocks in said pattern of a current frame or field for further processing;

identifying for each selected block a block from a previous frame or field representative of said selected block; and calculating from the difference in position of each of said selected blocks and associated representative blocks, respectively, the motion vectors for each of said selected blocks in the current frame or field.

2. The method of claim 1 wherein said identifying step includes the steps of:

designating search areas in said previous frame or field for each one of said selected blocks in said current frame or field; and searching in said designated search areas for blocks that best match associated selected blocks in said current frame or field, respectively.

3. The method of claim 1, further including the step of:

determining the motion vectors for each one of unselected blocks in said pattern by using the motion vectors for associated neighboring selected blocks of said unselected blocks, respectively.

4. The method of claim 2, further including the steps of:

forming a sparse pattern of pixels for each one of said selected blocks of pixels; and selecting portions of said pattern of pixels for each selected block, for use in said searching step.

5. The method of claim 4, further including alternately and successively selecting one portion of said pattern of pixels associated with a block being searched for a match at one location in said designated search area, and selecting another portion of said pattern of pixels with the block being next moved to another location in the search area, the different portions of pixels searched being alternately selected as successive locations are searched, respectively.

6. A method for determining motion vectors in an imaging system, said imaging system producing successive frames and/or fields each of a lattice of pixels, with each frame or field representing an image at a given instant in time, said method comprising the steps of:

dividing each frame or field into blocks of pixels;

forming a pattern of first and second groups of said blocks for each of said frames or fields;

identifying one of said first and second groups of said blocks in said pattern as blocks to be involved for further processing in a full search;

designating a search area in a previous frame or field;

selecting from a current frame or field one of said blocks identified for a full search;

searching in said designated search area of said previous frame or field for a block of pixels therein that best matches the selected block from said current frame or field; and determining the difference between relative positions of said selected block in said current frame or field, and the block best matched thereto in the search area of said previous frame or field, for obtaining the motion vector indicative of movement of said selected block between said previous and current frames or fields.

7. The method of claim 6, further including the steps of successively repeating said designating, selecting, searching, and determining steps in a repetitive manner, for obtaining the motion vectors for each of said blocks identified for a full search.

8. The method of claim 7, further including the steps of:

selecting one of said blocks of said pattern not identified for a full search; and determining the motion vector associated with the selected unsearched block by either selecting from amongst motion vectors from neighboring blocks that were fully searched, or by interpolating from these motion vectors.

9. The method of claim 8, further including the steps of successively repeating said selecting and motion vector determining steps for an unsearched block, in a repetitive manner for each of said blocks not identified for a full search.

10. The method of claim 6, further including the steps of:
forming a sparse pattern of pixels for each block of pixels; and
identifying a portion of various ones of said pixels in said pattern for use in said searching step.

11. The method of claim 7, further including the steps of:
forming a sparse pattern of pixels for each block of pixels; and
identifying a portion of various ones of said pixels in said pattern for use in said searching step.

12. The method of claim 8, further including the steps of:
forming a sparse pattern of pixels for each block of pixels; and
identifying a portion of various ones of said pixels in said pattern for use in said searching step.

13. The method of claim 9, further including the steps of:
forming a sparse pattern of pixels for each block of pixels; and
identifying a portion of various ones of said pixels in said pattern for use in said searching step.

14. The method of claim 10, further including in said searching step for each block searched in said designated search area, alternately and successively using one portion of said pixels in said sparse pattern of pixels for one block search location, and another portion of said pixels in said sparse pattern of pixels for a next block search location, and repeating this search routine until a block has been searched throughout the search area.

15. A block motion estimation system for motion compensation coding image sequences comprising:
a first memory for storing a current frame or field of pixels;
a second memory for storing a previous frame or field of pixels for an associated image;
selection means for selecting one of a first and second groups of blocks from a predetermined pattern of said blocks in said first memory, for further processing;
identification means for identifying for each selected block a block of pixels from said previous frame or field stored in said second memory, that is representative of said selected block; and
means for calculating from the difference in position of each of said selected blocks in said current frame or field, and associated representative blocks in said previous frame or field, respectively, the motion vectors for each of said selected blocks in the current frame or field.

16. The system of claim 15, wherein said calculating means further includes means for determining motion vectors for the unselected ones of said blocks from the predetermined pattern thereof, the determination being made by using motion vectors of neighboring ones of selected blocks relative to unselected blocks, respectively.

17. The system of claim 15, wherein said identification means includes:
search means for moving each selected block from one position to another in a successive manner until all pixels within a designated search area in said previous frame or field have been covered, whereby the group of pixels in said previous frame or field best matching said selected block are taken as being representative of the latter.

18. The system of claim 17, wherein said search means further includes means for selecting from a predetermined sparse pattern of the pixels in each selected block, a portion of the pixels for searching for a match therewith with a group of pixels in the previous frame or field, as said selected block is moved from one position to another in said designated search area.

19. The system of claim 18, wherein said search means further includes means for alternately using one portion of the pixels from said sparse pattern for a selected block at one location in said designated search area, and using another portion of pixels from said sparse pattern at the next location searched in said designated area, and repeating the latter operation of said alternating means in a repetitive manner until all pixels of the previous frame or field in said designated search area have been searched.

20. A method for determining motion vectors in an imaging system producing successive frames and/or fields each of a lattice of pixels, said method comprising the steps of:
dividing each frame or field into blocks of pixels;
selecting one of said blocks at a time from a current frame or field for processing;
forming a sparse pattern of pixels for each one of said selected block of pixels;
selecting a portion of said pattern of pixels for said selected block;
designating a search area in said previous frame or field for said selected block in said current frame or field;
searching in said designated search areas for the block that best matches or represents the associated selected sparse pattern portion of the selected block in said current frame or field;
calculating from the difference in position of said selected block and identified representative block, the motion vector for said selected block in the current frame or field; and
repeating said selecting, designating, searching, and calculating steps for each block of said current frame or field.

21. The method of claim 20, further including alternately and successively selecting one portion of said pattern of pixels associated with a block being searched for a match at one location in said designated search area, and selecting another portion of said pattern of pixels with the block being next moved to another location in the search area, the different portions of pixels searched being alternately selected as successive locations are searched, respectively.

22. A method for determining motion vectors in an imaging system producing successive frames and/or fields each of a lattice of pixels, said method comprising the steps of:
dividing each frame or field into blocks of pixels;
forming a pattern of said blocks for each of said frames or fields;
selecting a portion of various ones of said blocks in said pattern of a current frame or field;
identifying for each selected block a block from a previous frame or field representative of said selected block;

calculating from the difference in position of each of said selected blocks and associated representative blocks, respectively, the motion vectors for each of said selected blocks in the current frame or field; and determining the motion vectors for each one of unselected blocks in said pattern by using the motion vectors for associated neighboring selected blocks of said unselected blocks, respectively.

23. A method for determining motion vectors in an imaging system, said imaging system producing successive frames and/or fields each of a lattice of pixels, with each frame or field representing an image at a given instant in time, said method comprising the steps of:

dividing each frame or field into blocks of pixels;

forming a pattern of said blocks for each of said frames or fields;

identifying a portion of various ones of said blocks in said pattern as blocks to be involved in a full search;

designating a search area in a previous frame or field;

selecting from a current frame or field one of said blocks identified for a full search;

searching in said designated search area of said previous frame or field for a block of pixels therein that best matches the selected block from said current frame or field;

determining the difference between relative positions of said selected block in said current frame or field, and the block best matched thereto in the search area of said previous frame or field, for obtaining the motion vector indicative of movement of said selected block between said previous and current frames or fields;

successively repeating said designating, selecting, searching, and determining steps in a repetitive manner, for obtaining the motion vectors for each of said block identified for a full search;

selecting one of said blocks of said pattern not identified for a full search; and determining the motion vector associated with the selected unsearched block by either selecting from amongst motion vectors from neighboring blocks that were fully searched, or by interpolating from these motion vectors.

24. A method for determining motion vectors in an imaging system, said imaging system producing successive frames and/or fields each of a lattice of pixels, with each frame or field representing an image at a given instant in time, said method comprising the steps of:

dividing each frame or field into blocks of pixels;

forming a pattern of said blocks for each of said frames or fields;

identifying a portion of various ones of said blocks in said pattern as blocks to be involved in a full search;

designating a search area in a previous frame or field;

selecting from a current frame or field one of said blocks identified for a full search;

searching in said designated search area of said previous frame or field for a block of pixels therein that best matches the selected block from said current frame or field;

determining the difference between relative positions of said selected block in said current frame or field, and the block best matched thereto in the search area of said previous frame or field, for obtaining the motion vector indicative of movement of said selected block between said previous and current frames or fields;

successively repeating said designating, selecting, searching, and determining steps in a repetitive manner, for obtaining the motion vectors for each of said blocks identified for a full search;

selecting one of said blocks of said pattern not identified for a full search;

determining the motion vector associated with the selected unsearched block by either selecting from amongst motion vectors from neighboring blocks that were fully searched, or by interpolating from these motion vectors; and successively repeating said selecting and motion vector determining steps for an unsearched block, in a repetitive manner for each of said blocks not identified for a full search.

25. A block motion estimation system for motion compensation coding image sequences comprising:

a first memory for storing a current frame or field of pixels;

a second memory for storing a previous frame or field of pixels for an associated image;

selection means for selecting from a predetermined pattern of said blocks in said first memory, either all or a portion of various ones of said blocks in said pattern;

identification means for identifying for each selected block a block of pixels from said previous frame or field stored in said second memory, that is representative of said selected block;

means for calculating from the difference in position of each of said selected blocks in said current frame or field, and associated representative blocks in said previous frame or field, respectively, the motion vectors for each of said selected blocks in the current frame or field; and said calculating means further including means for determining motion vectors for the unselected ones of said blocks from the predetermined pattern thereof, the determination being made by using motion vectors of neighboring ones of selected blocks relative to unselected blocks, respectively.

* * * * *

UNITED STATES PATENT AND TRADEMARK OFFICE
CERTIFICATE OF CORRECTION

PATENT NO. : 5,210,605
DATED : May 11, 1993
INVENTOR(S) : Andre Zaccarin and Bede Liu It is certified that error appears in the above-identified patent and that said Letters Patent is hereby corrected as shown below:

Column 5, line 66, change "$I^n(s)$" to --$\hat{I}^n(s)$--.

Column 5, line 68, change "$I^n(s)$ may" to --$\hat{I}^n(s)$ may--.

Column 6, line 43, change "$I^{n-1}$" to --$\hat{I}^{n-1}$--.

Column 6, line 50, change "$\tilde{v}_R^n$" to --$\tilde{v}_R^n$--.

Column 13, line 36, change "H/(2M-1" to --H/(2M)-1--.

Column 19, line 38, change "block" to --blocks--.

Signed and Sealed this

First Day of February, 1994

Attest:

BRUCE LEHMAN

*Attesting Officer*    *Commissioner of Patents and Trademarks*